US012776139B2

(12) United States Patent
Lee et al.

(10) Patent No.: US 12,776,139 B2
(45) Date of Patent: Oct. 27, 2026

(54) METHOD AND MOBILITY DEVICES FOR MULTI-TASK PROCESSING BASED ON MULTI-TASK ARTIFICIAL INTELLIGENCE

(71) Applicants: Hyundai Motor Company, Seoul (KR); Kia Corporation, Seoul (KR); Daegu Gyeongbuk Institute of Science and Technology, Daegu (KR)

(72) Inventors: Hyuk Zae Lee, Hwaseong-Si (KR); Won Hyeok Choi, Daegu (KR); Sung Hoon Im, Daegu (KR); Min Gyu Shin, Daegu (KR)

(73) Assignees: Hyundai Motor Company, Seoul (KR); Kia Corporation, Seoul (KR); Daegu Gyeongbuk Institute of Science and Technology, Daegu (KR)

( * ) Notice: Subject to any disclaimer, the term of this patent is extended or adjusted under 35 U.S.C. 154(b) by 199 days.

(21) Appl. No.: 18/887,240

(22) Filed: Sep. 17, 2024

(65) Prior Publication Data

US 2025/0299480 A1 Sep. 25, 2025

(30) Foreign Application Priority Data

Mar. 25, 2024 (KR) ........................ 10-2024-0040179

(51) Int. Cl.
*G06V 10/96* (2022.01)
*G06V 10/77* (2022.01)
(Continued)

(52) U.S. Cl.
CPC .......... *G06V 10/96* (2022.01); *G06V 10/7715* (2022.01); *G06V 10/806* (2022.01); *G06V 10/82* (2022.01); *G06V 20/56* (2022.01)

(58) Field of Classification Search
CPC .. G06V 10/96; G06V 10/7715; G06V 10/806; G06V 10/82; G06V 20/56; G06V 10/764; G06N 3/045; G06N 3/0464; G06N 3/048; G06T 7/10; G06T 7/593; G06T 2207/20084
See application file for complete search history.

(56) References Cited

U.S. PATENT DOCUMENTS 11,886,199 B2 * 1/2024 Qi ........................ G05D 1/2465
12,116,008 B2 * 10/2024 Hotson ................ G06F 18/254
(Continued)

*Primary Examiner* — Van D Huynh
(74) *Attorney, Agent, or Firm* — Banner & Witcoff, Ltd.

(57) ABSTRACT

A method for multi-task processing based on an artificial intelligence (AI) includes: obtaining an aggregate feature map by aggregating intermediate feature maps that are generated sequentially and adjacently from a plurality of layers arranged in a low-resolution pathway of a neural network with a two-pathway structure, in which image data is input, and obtaining a detailed feature map from a high-resolution pathway; generating a deep feature map based on the aggregate feature map and the detailed feature map; generating attention information including a task-specific channel attention for each task extracted from the intermediate feature maps and a task-generic spatial attention extracted from the detailed feature map; and generating a task-specific feature map for each task by reflecting the attention information in the deep feature map and providing multiple pieces of task output information by inferring the task-specific feature map.

20 Claims, 13 Drawing Sheets

(51) Int. Cl.

| | |
|---|---|
| ***G06V 10/80*** | (2022.01) |
| ***G06V 10/82*** | (2022.01) |
| ***G06V 20/56*** | (2022.01) |

(56) References Cited

U.S. PATENT DOCUMENTS

| | | | | |
|---|---|---|---|---|
| 2019/0361454 | A1* | 11/2019 | Zeng ................. | B60W 50/0098 |
| 2020/0142421 | A1* | 5/2020 | Palanisamy ......... | B60W 60/001 |
| 2020/0223434 | A1* | 7/2020 | Campos Macias .... | G06N 20/20 |
| 2022/0301202 | A1* | 9/2022 | Park .......................... | G06T 7/50 |
| 2024/0078790 | A1* | 3/2024 | Sundareshan ...... | G01C 21/3822 |

* cited by examiner (a) Visualization of Task-generic/adaptive features.

(b) Visualization of Task-adaptive features w/wo the spatial attention.

FIG. 12

| | Backbone | 3D Object Detection (%) | Semantic Segmentation (%) | Depth Estimation (%) | FPS |
|---|---|---|---|---|---|
| SINGLE TASK | DLA34 [5] | 0.00 | 0.00 | 0.00 | 5.5 |
| MULTIPLE TASKS | DLA34 [5] | -30.25 | -3.90 | -11.82 | 17.3 |
| | ResNet50 [6] | -4.82 | +0.03 | -6.73 | 12.4 |
| | ICNet [7] | -27.28 | -7.83 | -3.27 | 21.7 |
| | DDRNet-23 [4] | -9.83 | -5.39 | -7.82 | 30.1 |
| | PIDNet-M [9] | -6.91 | -12.16 | -14.00 | 24.9 |

| | Backbone | 3D Object Detection (%) | Semantic Segmentation (%) | Depth Estimation (%) | FPS |
|---|---|---|---|---|---|
| SINGLE TASK | DLA34 [5] | 0.00 | 0.00 | 0.00 | 5.5 |
| MULTIPLE TASKS | Ours (w/o TAG) | 5.33 | -0.72 | 0.18 | 30.8 |
| | Ours | 12.21 | 0.18 | 2.55 | 30.2 |

FIG. 13

| Method | Backbone | 3D Det. | | Semantic seg. | | Dense depth | | Δτ(%) | FPS | GFLOPs | Params(M) |
|---|---|---|---|---|---|---|---|---|---|---|---|
| | | DS ↑ | | mIoU ↑ | | RMSE ↓ | | | | | |
| STL | DLA34 | 54.55 | | - | | - | | 0.00 | 17.4 | 246 | 20.1 |
| | | - | | 66.38 | | - | | 0.00 | 17.8 | 222 | 19.9 |
| | | - | | - | | 5.50 | | 0.00 | 17.8 | 223 | 19.9 |
| MTL | DLA34 | 38.05 | (-30.25%) | 63.79 | (-3.90%) | 6.15 | (-11.82%) | -15.32 | 17.3 | 285 | 20.4 |
| | ResNet50 | 51.92 | (-4.82%) | 66.40 | (+0.03%) | 5.87 | (-6.73%) | -3.84 | 12.4 | 373 | 44.5 |
| | ICNet | 39.67 | (-27.28%) | 61.18 | (-7.83%) | 5.68 | (-3.27%) | -12.79 | 21.7 | 226 | 44.4 |
| | DDRNet-23-slim | 32.36 | (-40.68%) | 60.06 | (-9.52%) | 6.26 | (-13.82%) | -21.34 | 50.9 | 75 | 7.5 |
| | DDRNet-23 | 49.19 | (-9.83%) | 62.80 | (-5.39%) | 5.93 | (-7.82%) | -7.68 | 30.1 | 216 | 23.9 |
| | DDRNet-39 | 50.83 | (-6.82%) | 67.17 | (+1.19%) | 5.59 | (-1.64%) | -2.42 | 20.3 | 345 | 35.5 |
| | PIDNet-S | 40.12 | (-26.45%) | 50.57 | (-23.82%) | 6.82 | (-24.00%) | -24.76 | 42.9 | 84 | 9.4 |
| | PIDNet-M | 50.78 | (-6.91%) | 58.31 | (-12.16%) | 6.27 | (-14.00%) | -11.02 | 24.9 | 241 | 32.2 |
| | PIDNet-L | 53.48 | (-1.96%) | 58.81 | (-11.40%) | 6.33 | (-15.09%) | -9.48 | 20.4 | 339 | 40.3 |
| MTL | Ours(w/o TAG) | 57.46 | (+5.33%) | 65.90 | (-0.72%) | 5.49 | (+0.18%) | +1.60 | 30.8 | 218 | 32.8 |
| | Ours | 61.21 | (+12.21%) | 66.50 | (+0.18%) | 5.36 | (+2.55%) | +4.98 | 30.2 | 219 | 33.9 |

METHOD AND MOBILITY DEVICES FOR MULTI-TASK PROCESSING BASED ON MULTI-TASK ARTIFICIAL INTELLIGENCE

CROSS REFERENCE TO RELATED APPLICATIONS

The present application claims priority to Korean provisional Patent application No. 10-2024-0040179, filed Mar. 25, 2024, the entire contents of which are incorporated herein for all purposes.

TECHNICAL FIELD

The present disclosure relates to a method for processing multiple tasks based on an artificial intelligence and a mobility device using the method, and more particularly, to a multi-task processing method for inferring tasks of semantic segmentation, depth estimation, and monocular 3D object detection simultaneously based on an artificial intelligence and a mobility device using the method.

BACKGROUND

At least some studies on neural network structures use artificial intelligence (AI) models with different optimized structures to consider real-time inference for monocular 3D object detection and semantic segmentation.

An AI model for object detection identifies and estimates objects with various sizes and types. Accordingly, a structure used for representing such variety combines outputs of intermediate layers of a neural network. On the other hand, an AI model for semantic segmentation uses a two-pathway structure that merges a high-resolution path for detailed features of image space and a low-resolution path representing overall semantic features.

If hard-parameter sharing, which is a multi-task learning technique, is used on a real-time backbone in order to improve algorithm speed, an AI model with high inference speed may be constructed. There may be a problem of overall performance degradation due to the difference in tasks.

A specific task is conventionally performed by using an AI model structure optimized therefor, and in case no optimized AI model structure is used, there is a limitation on expected performance.

Additionally or alternatively, if a plurality of tasks are processed using respective AI models, there may be a problem in that a lot of resources need to be allocated to a controller with respect to processing all the tasks.

Accordingly, autonomous driving of a mobility requires an AI model structure capable of real-time inference for main tasks such as object detection, semantic segmentation, and depth estimation, and an attention-based model structure capable of resolving a negative transfer phenomenon.

SUMMARY

The present disclosure may be directed to providing a multi-task processing method for inferring tasks of semantic segmentation, depth estimation, and/or monocular 3D object detection simultaneously based on an artificial intelligence and a mobility device (e.g., a vehicle, a drone, a robot, etc.) using the method.

The technical problems solved by the present disclosure are not limited to the above described technical problems. Other technical problems that are not described herein should be more clearly understood by a person having ordinary skill in the technical field, to which the present disclosure belongs, from the following description.

A method may be performed by an apparatus, of a vehicle, for multi-task processing based on an artificial intelligence (AI). The method may comprise: obtaining an aggregated feature map by aggregating intermediate feature maps that are generated sequentially and adjacently from a plurality of layers arranged in a low-resolution pathway of a neural network having a two-pathway structure, wherein image data is input to the low-resolution pathway; obtaining a detailed feature map from a high-resolution pathway of the neural network; generating, based on the aggregated feature map and the detailed feature map, a deep feature map; generating attention information comprising: a task-specific channel attention for each task extracted from the intermediate feature maps; and a task-generic spatial attention extracted from the detailed feature map; generating a task-specific feature map for each task by reflecting the attention information in the deep feature map and providing multiple pieces of task output information based on the task-specific feature map; and causing, based on at least the task-specific feature map, autonomous driving control of the vehicle.

The obtaining of the aggregated feature map may comprise: recursively aggregating the aggregated feature map from an adjacent layer among the plurality of layers until a single number of the aggregated feature map is produced by an output of the obtaining of the aggregated feature map.

The obtaining of the aggregated feature map may comprise: upsampling an intermediate feature map having a first resolution, lower than a threshold resolution, among adjacent intermediate feature maps by applying a bilinear interpolation to the intermediate feature map having the first resolution; and merging the upsampled intermediate feature map and an intermediate feature map having a second resolution, higher than the threshold resolution, among the adjacent intermediate feature maps.

The obtaining of the detailed feature map may comprise: obtaining the detailed feature map based on intermediate feature maps that are generated from a layer with a higher resolution than a layer associated with a lowest resolution in the low-resolution pathway.

The generating of the deep feature map may comprise: upsampling, using a bilinear interpolation, the aggregated feature map; matching, through a convolution layer, a channel dimension of the detailed feature map with a channel dimension of the upsampled aggregated feature map; and generating the deep feature map using an element-wise summation of the upsampled aggregated feature map and the detailed feature map with the matched channel dimension.

The task-specific channel attention may be generated in a plural number for the each task. The task-specific channel attention may be obtained by applying an activation function to a value that is output by inputting the intermediate feature maps to a channel attention layer corresponding to the each task. The channel attention layer may be configured as a multi-layer neural network involving global average pooling.

Intermediate feature maps, which are input to generate the task-specific channel attention, may be intermediate feature maps with a lowest resolution in the low-resolution pathway.

The method may further comprise obtaining the task-generic spatial attention by applying an activation function to a value that is output by inputting the detailed feature map to a task-generic spatial attention layer including dilated convolution.

The multiple pieces of task output information may comprise multiple pieces of analysis information about the image data with different features. The multiple pieces of analysis information may comprise at least two of object classification information, semantic segmentation information, and depth information.

The providing of the multiple pieces of task output information may comprise: using a head network having a multi-head structure that outputs multiple tasks according to the task-specific feature map. The multi-head structure may have a head layer that is allocated to each of the tasks, and the head layer may comprise a convolution layer and an activation function.

A vehicle may comprise: a sensor configured to obtain data associated with an external environment of the vehicle and an internal state of the vehicle and to obtain at least image data; a memory configured to store at least one instruction; and a processor configured to execute the at least one instruction to cause the vehicle to: obtain an aggregated feature map by aggregating intermediate feature maps that are generated sequentially and adjacently from a plurality of layers arranged in a low-resolution pathway of a neural network having a two-pathway structure, wherein image data is input to the low-resolution pathway, obtain a detailed feature map from a high-resolution pathway of the neural network, generate, based on the aggregated feature map and the detailed feature map, a deep feature map, generate attention information comprising: a task-specific channel attention for each task extracted from the intermediate feature maps; and a task-generic spatial attention extracted from the detailed feature map, generate a task-specific feature map for each task by reflecting the attention information in the deep feature map and provide multiple pieces of task output information based on the task-specific feature map, and cause, based on at least the task-specific feature map, autonomous driving control of the vehicle.

The vehicle may be configured to perform one or more operations and/or methods described herein.

The features of the present disclosure, which are briefly summarized herein, are only examples of aspects of features of the present disclosure and detailed description of the disclosure which follows and are not intended to limit the scope of the present disclosure.

The technical problems solved by the present disclosure are not limited to the above mentioned technical problems. Other technical problems solved by the present disclosure, which are not described herein should be more clearly understood by a person having ordinary skill in the art of technical field to which the present disclosure belongs, from the following description.

According to the present disclosure, it is possible to provide a multi-task processing method for inferring tasks of semantic segmentation, depth estimation, and monocular 3D object detection simultaneously based on an artificial intelligence and a mobility device using the method.

In addition, according to the present disclosure, it is possible to provide a multi-task AI model structure capable of resolving a negative transfer phenomenon that is a main problem in multi-task learning.

In addition, according to the present disclosure, as tasks are processed through an optimized single AI model structure and a task-specific attention generator, even a small amount of resources of a controller is enough to secure good performance in inference speed.

In addition, according to the present disclosure, as inference speed required for decision making for autonomous driving is provided, it is possible to provide an AI model suitable for autonomous driving logic for which real-time inference is essential.

In addition, according to the present disclosure, it is possible to provide an AI model that is applicable to monocular camera image recognition systems mounted in various types of mobilities.

The technical effects to be achieved by the present disclosure are not limited to the above technical effects, and other technical effects not stated herein should be more clearly understood by a person having ordinary skill in the technical field, to which the present disclosure belongs, from the following description.

BRIEF DESCRIPTION OF THE DRAWINGS

FIG. 12 shows an example of comparing results of tasks performed by using a multi-task AI model with a two-pathway structure and an AI model for a single task.

FIG. 13 shows an example of the increase and decrease in performance based on a comparison between a multi-task AI model with a two-pathway structure an AI model for a single task.

DETAILED DESCRIPTION

Figure 1:
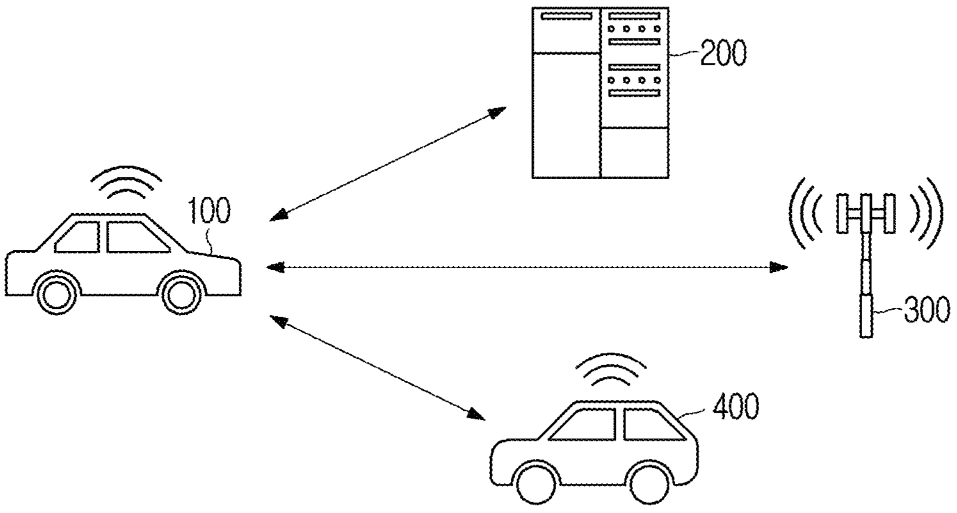
FIG. 1 shows an example of a mobility device communicating with a different device to transmit and receive data.

Herein after, examples of the present disclosure are described in detail with reference to the accompanying drawings so that those having ordinary skill in the art may easily implement the present disclosure. However, examples of the present disclosure may be implemented in various different ways and thus the present disclosure is not limited to the examples described therein.

In describing examples of the present disclosure, well-known functions or constructions have not been described in detail since a detailed description thereof may have unnecessarily obscured the gist of the present disclosure. The same constituent elements in the drawings are denoted by the same reference numerals and a repeated or duplicative description of the same elements has been omitted.

In the present disclosure, when an element is simply referred to as being "connected to", "coupled to" or "linked to" another element, this may mean that an element is "directly connected to", "directly coupled to", or "directly linked to" another element or this may mean that an element is connected to, coupled to, or linked to another element with another element intervening therebetween. In addition, when an element "includes" or "has" another element, this means that one element may further include another element without excluding another component unless specifically stated otherwise.

In the present disclosure, the terms first, second, etc. are only used to distinguish one element from another and do not limit the order or the degree of importance between the elements unless specifically stated otherwise. Accordingly, a first element in an example may be termed a second element in another example, and, similarly, a second element in an example could be termed a first element in another example, without departing from the scope of the present disclosure.

In the present disclosure, elements are distinguished from each other for clearly describing each feature, but this does not necessarily mean that the elements are separated. In other words, a plurality of elements may be integrated in one hardware or software unit, or one element may be distributed and formed in a plurality of hardware or software units. Therefore, even if not mentioned otherwise, such integrated or distributed examples are included in the scope of the present disclosure.

In the present disclosure, elements described in various examples do not necessarily mean essential elements, and some of them may be optional elements. Therefore, an example composed of a subset of elements described in an example is also included in the scope of the present disclosure. In addition, examples including other elements in addition to the elements described in the various examples are also included in the scope of the present disclosure.

The advantages and features of the present disclosure and the ways of attaining them should become apparent to those of ordinary skill in the art with reference to examples of the present disclosure described below in detail in conjunction with the accompanying drawings. The examples of the present disclosure, however, may be embodied in many different forms and should not be constructed as being limited to the example examples set forth herein. Rather, the examples described herein are provided to make this disclosure more complete and to fully convey the scope of the present disclosure to those having ordinary skill in the art to which the present disclosure pertains.

In the present disclosure, each of phrases such as "A or B", "at least one of A and B", "at least one of A or B", "A, B or C", "at least one of A, B and C", and each of the phrases such as "at least one of A, B or C" and "at least one of A, B, C or combination thereof" may include any one or all possible combinations of the items listed together in the corresponding one of the phrases.

In the present disclosure, expressions of location relations used in the present specification such as "upper", "lower", "left" and "right" are employed for the convenience of explanation, and when drawings illustrated in the present specification are inversed, the location relations described in the specification may be inversely understood. When a component, device, element, or the like of the present disclosure is described as having a purpose or performing an operation, function, or the like, the component, device, or element should be considered herein as being "configured to" meet that purpose or perform that operation or function.

Hereinafter, referring to FIG. 1 and FIG. 2, a mobility implementing autonomous driving, for example, by recognizing a road boundary object may be described.

An automation level of an autonomous driving vehicle may be classified as follows, according to the American Society of Automotive Engineers (SAE). At autonomous driving level 0, the SAE classification standard may correspond to "no automation," in which an autonomous driving system is temporarily involved in emergency situations (e.g., automatic emergency braking) and/or provides warnings only (e.g., blind spot warning, lane departure warning, etc.), and a driver is expected to operate the vehicle. At autonomous driving level 1, the SAE classification standard may correspond to "driver assistance," in which the system performs some driving functions (e.g., steering, acceleration, brake, lane centering, adaptive cruise control, etc.) while the driver operates the vehicle in a normal operation section, and the driver is expected to determine an operation state and/or timing of the system, perform other driving functions, and cope with (e.g., resolve) emergency situations. At autonomous driving level 2, the SAE classification standard may correspond to "partial automation," in which the system performs steering, acceleration, and/or braking under the supervision of the driver, and the driver is expected to determine an operation state and/or timing of the system, perform other driving functions, and cope with (e.g., resolve) emergency situations. At autonomous driving level 3, the SAE classification standard may correspond to "conditional automation," in which the system drives the vehicle (e.g., performs driving functions such as steering, acceleration, and/or braking) under limited conditions but transfer driving control to the driver when the required conditions are not met, and the driver is expected to determine an operation state and/or timing of the system, and take over control in emergency situations but do not otherwise operate the vehicle (e.g., steer, accelerate, and/or brake). At autonomous driving level 4, the SAE classification standard may correspond to "high automation," in which the system performs all driving functions, and the driver is expected to take control of the vehicle only in emergency situations. At autonomous driving level 5, the SAE classification standard may correspond to "full automation," in which the system performs full driving functions without any aid from the driver including in emergency situations, and the driver is not expected to perform any driving functions other than determining the operating state of the system. Although the present disclosure may apply the SAE classification standard for autonomous driving classification, other classification methods and/or algorithms may be used in one or more configurations described herein. One or more features associated with autonomous driving control may be activated based on configured autonomous driving control setting(s) (e.g., based on at least one of: an autonomous driving classification, a selection of an autonomous driving level for a vehicle, etc.).

An autonomous driving vehicle may encounter different types of roads, for example, such as highways, city streets, rural roads, residential streets, mountain roads, gravel or dirt roads, expressways, toll roads, bridges and overpasses, tunnels, etc.

An autonomous driving vehicle may use road data for autonomous driving. For example, a high density (HD) map may include various road data necessary for autonomous driving, which may include, for example, lanes (e.g., a number and orientation of lanes), traffic lights (e.g., location and status of traffic lights), signs (e.g., location and status of road signs), road conditions (e.g., potholes, bumps, road texture), traffic flow (e.g., traffic density, speeds, patterns), obstacles and hazard information (e.g., construction zones, debris, pedestrians), location of crosswalks and pedestrian paths, layouts of intersections, and roadside features (e.g., barriers, guardrails, sidewalks, edges).

FIG. 1 shows an example of a mobility device communicating with a different device to transmit and receive data.

Referring to FIG. 1, a mobility device (e.g., a mobility 100) may be driven, for example, based on electric energy or fossil energy. In the case of electric energy, for example, the mobility 100 may be a pure battery-based mobility driven only by a high-voltage battery or employ a gas-based fuel cell as an energy source. In addition, the fuel cell may use various types of gas capable of generating electric energy, and for example, the gas may be hydrogen. However, without being limited thereto, various gases may be applicable. In the case of fossil energy, the mobility 100 is driven based on fuels such as gasoline, diesel, or liquefied gas, and may be equipped with an engine that drives a wheel drive unit 114 by combustion of the fuel. The engine may be included in an energy generator 112 from a perspective of providing a driving torque of a wheel to the wheel drive unit 114.

For convenience of explanation, the present disclosure describes the mobility 100 as an example mobility based on electric energy, but except regenerative braking, charge, and discharge described in the present disclosure, an example of the present disclosure may certainly be applicable to a mobility based on fossil energy.

The mobility 100 may refer to a moving object capable of physically moving through space. The mobility 100 is a vehicle as a ground moving object driven on the ground and may be a normal passenger vehicle or commercial vehicle, a purpose built vehicle (PBV), and the like. The mobility 100 may be a four-wheel vehicle, for example, a sedan, a sports utility vehicle (SUV), and a pickup truck and may also be a vehicle with five or more wheels, for example, a bus, a lorry, a container truck, and a heavy vehicle. In addition, the mobility 100 may include a means of aerial transportation such as an airplane, a drone, and a helicopter and, without being limited thereto, may also include a means of transportation capable of moving in the sea such as a ship and a submarine.

The mobility 100 may be driven by being controlled in autonomous driving, and the autonomous driving may be implemented as semi-autonomous driving or full autonomous driving. Full autonomous driving may be provided as autonomous moving under the complete control of a processor 120 of the mobility 100 without a user's intervention even in an uncertain driving situation. Semi-autonomous driving may be provided as autonomous moving that requires a driver's intervention in a specific driving situation. If the driving situation occurs, semi-autonomous driving may be implemented such that the processor 120 disables autonomous driving and switches control to the user, and thus the user performs manual driving. According to the autonomous driving levels defined by the Society of Automotive Engineers (SAE), semi-autonomous driving may correspond to the autonomous driving levels 1 to 4, and full autonomous driving may correspond to the level 5.

Meanwhile, the mobility 100 may communicate with other devices 200 and 300 or another mobility 400. For example, another device may include the server 200 for supporting various control, state management and driving of the mobility 100, the ITS device 300 for receiving information from an intelligent transportation system (ITS), and various types of user devices. For example, the server 200 is an external device operated by a mobility manufacturer or provided for an autonomous driving service and may receive connected data of the mobility 100 or transmit data necessary for autonomous driving. In order to support autonomous driving and various services for the mobility 100, the server 200 may transmit various types of information and software modules used for controlling the mobility 100 to the mobility 100 as a response to a request and data transmitted from the mobility 100 and a user device.

For example, the ITS device 300 may be a road side unit (RSU), and the ITS device 300 may assist a user in driving his own car or support autonomous driving of the mobility 100 by exchanging mobility recognition data, driving control and situation data, environment data surrounding a mobility, and map data through V2I with the mobility 100. Through V2V with the another mobility 400, the mobility 100 may support a driver's driving his own car or autonomous driving by exchanging the above-listed data.

The mobility 100 may communicate with another mobility or another device based on cellular communication, wireless access in vehicular environment (WAVE) communication, dedicated short range communication (DSRC) or short range communication, or any other communication scheme.

For example, the mobility 100 may use LTE as a cellular communication network, a communication network such as 5G, a WiFi communication network, a WAVE communication network, and the like to communicate with the server 200, the ITS device 300, and another mobility 400. As another example, DSRC used in the mobility 100 may be used for mobility-to-mobility communication. A communication scheme among the mobility 100, the server 200, the ITS device 300, another mobility 400, and a user device is not limited to the above-described example.

Although not shown, the mobility 100 may receive image data taken by a capturing device fixed at a specific position or a mobile capturing device through the above-described means of communication.

Figure 2:
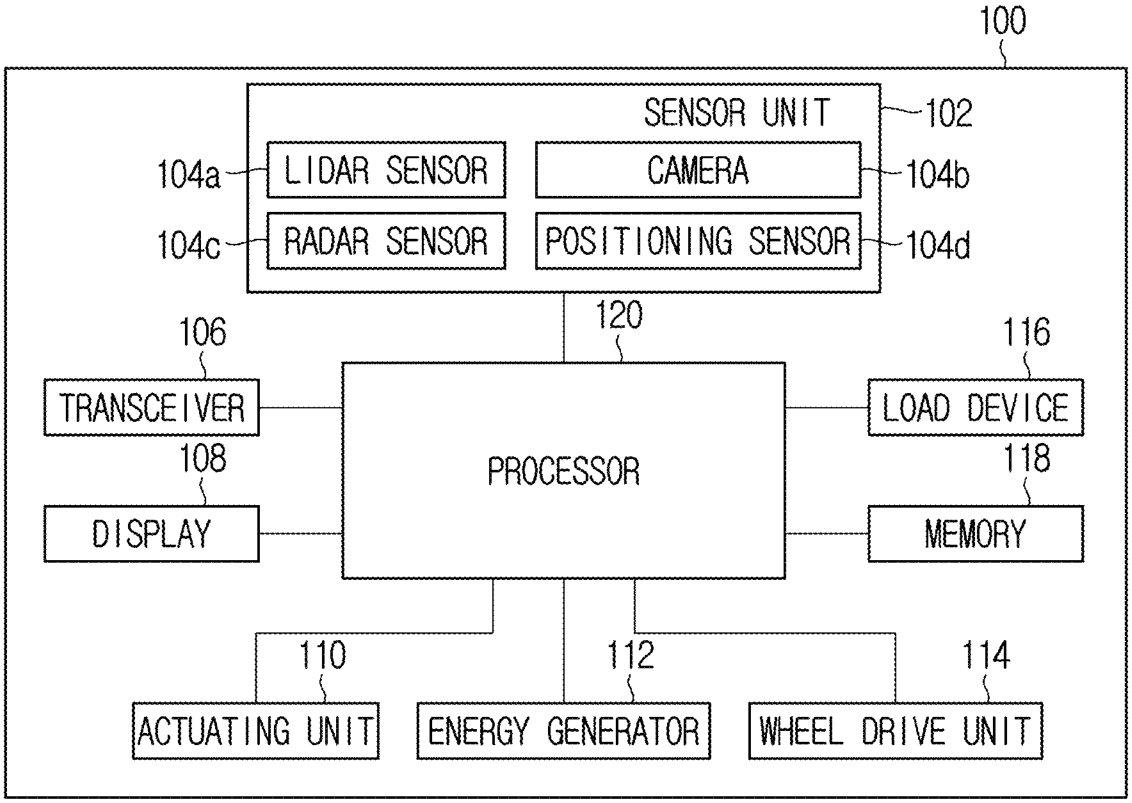
FIG. 2 shows an example of constituent modules of a mobility.

FIG. 2 shows an example of constituent modules of a mobility.

The mobility 100 may include a sensor (e.g., camera, blind spot monitoring sensor, line departure warning sensor, parking sensor, light sensor, rain sensor, traction control sensor, anti-lock braking system sensor, tire pressure monitoring sensor, seatbelt sensor, airbag sensor, fuel sensor, emission sensor, throttle position sensor, etc.) unit 102, a transceiver 106, a display 108, an actuating unit 110, an energy generator 112, a wheel drive unit 114, a load device 116, a memory 118, and a processor 120. Each constituent element is not a necessary constituent element, an additional configuration may be provided or omitted, and one configuration may be included in another configuration or be combined therewith so that a single configuration may perform a plurality of functions.

The sensor unit 102 may be equipped with various types of detectors for sensing various states and situations occurring in external and internal environments of the mobility 100 and for identifying location information of the mobility 100. That is, the sensor unit 102 may be configured as a multiple sensor module including heterogeneous sensors to obtain sensing data detected from each of the sensors.

Specifically, the sensor unit 102 may be equipped with a camera 104*b* and a radar sensor 104*c* for recognizing dynamic and static objects present around the mobility 100 and have a positioning sensor 104*d* capable of obtaining location information of a mobility. The sensor unit 102 may obtain sensor data including three-dimensional recognition data, perception/observation data, and positioning information by the above-described sensors. A three-dimensional (3D) perception sensor corresponds to a Lidar sensor, and these two terms may be used interchangeably below. Perception/observation data may include image data for a camera and radar data.

The Lidar sensor 104*a* may be a type of 3D recognition sensor according to the present disclosure, and the terms 'Lidar sensor' and '3D recognition sensor' may be used interchangeably below. The Lidar sensor 104*a* may be a sensor that observes a surrounding environment based on laser scanning and perceives a three-dimensional shape of an object. Specifically, the Lidar sensor 104*a* may obtain three-dimensional recognition data for a surrounding environment and an object by scanning laser around the mobility 100. Three-dimensional recognition data may include a point cloud representing a three-dimensional shape of an object, that is, detection data and image data for observation representing a surrounding environment. For example, detection data may be provided to identify each object by representing three-dimensional contours and shapes of objects and an arrangement of objects. For example, image data may be provided to identify an object and a surrounding environment through images of the object and the surrounding environment.

The camera 104*b* may obtain two-dimensional (2D) image data or image data with depth information for a surrounding environment of the mobility 100 and an object. According to the present disclosure, the camera 104*b* may include a monocular camera and obtain the above-described image data. For example, the radar sensor 104*c* may irradiate an electromagnetic wave with a predetermined wavelength and thus detect a behavior of an object based on an electromagnetic wave reflected from the object. For example, the behavior of an object May include the presence of the object, whether the object moves, a distance between the mobility 100 and the object, a speed of the object, and a movement direction.

Apart from the positioning sensor 104*d*, the sensor unit 102 may be equipped with a gyro sensor, an acceleration sensor, a wheel sensor, an autometer, a speed sensor and the like, in order to identify its own location, driving position, and speed. In addition, to monitor a user inside the mobility 100, a condition of an occupant, and an operating situation of an internal device of the mobility 100 that a user is capable of maneuvering, the sensor unit 102 may have an inward-facing camera 104*b*, a biosensor for detecting biosignals of a driver and an occupant, and various detection modules for detecting the operation and state of an internal device.

The present disclosure mainly describes sensors of the sensor unit 102 referred to for description of an example but may further include a sensor for detecting various situations not listed herein.

The transceiver 112 may support mutual communication with the server 200, the ITS device 300, and the neighbor mobility 400. In the present disclosure, AI model data, which is generated by using image data generated or stored in driving, may be transmitted to the server 200, and on the other hand, image or AI model data may be received from the server 200. In the present disclosure, the mobility 100 may transmit and receive data used in the method according to the present disclosure to and from the outside through the transceiver 116. According to an example of the present disclosure, the AI model data may be a trained multi-task AI model with a two-pathway structure.

The display 108 may serve as a user interface. By the processor 120, the display 108 may display an operating state and a control state of the mobility 100, path/traffic information, information on an energy remaining quantity, a content requested by a driver, and the like to be output. The display 108 may be configured as a touch screen capable of sensing a driver input and receive a request of a driver indicated to the processor 120.

A user may activate or deactivate an autonomous driving function through a soft-type interface like a touch of the display 108 or a hard-type interface provided in a predetermined position inside the mobility 100. In the case of a hard-type interface, for example, a button or key for an autonomous driving function may be installed on a steering wheel, a dashboard, and the like. In addition, the interfaces may be configured to provide detailed options for selecting various functions provided at a corresponding level of autonomous driving.

Meanwhile, the mobility 100 may include the actuating unit 110, the energy generator 112, the wheel drive unit 114, and the load device 116.

The actuating unit 110 may be equipped with at least one module for implementing a driving operation and perform at least one driving operation of longitudinal control like acceleration/deceleration and transverse control like steering. The actuating unit 110 may be equipped with not only a pedal and a steering wheel accepting a user's request for the control but also various operating modules for generating a driving operation according to the request in the wheel drive unit 114.

The energy generator 112 may generate and supply power and electricity used for a driving power system like the wheel drive unit 114 and the load device 116. In case the mobility 100 is driven based on electric energy, for example, the energy generator 112 may be configured as an electric battery or be configured as a combination of an electric battery and a fuel cell for charging the battery. In the case of a combination of an electric battery and a fuel cell, the energy generator 112 may include a tank for storing a material used to produce power of the fuel cell, for example, hydrogen gas. In case the mobility 100 is driven based on fossil energy, the energy generator 112 may be configured as an internal combustion engine.

The wheel drive unit 114 may include a plurality of wheels, a driving force transfer module for generating and giving a driving force to wheels or for transferring a driving force, a braking module for decelerating the driving of wheels, and a steering module for realizing transverse control of wheels. In case the mobility 100 is driven based on electric energy, the driving force transfer module may be configured as a motor module that generates a driving force based on power output from an electric battery. In case the mobility 100 is operated based on fossil energy, a driving force transfer module may be equipped with transmission and a gear module that transfer power of an internal combustion engine.

The load device 116 may be an auxiliary equipment mounted on the mobility 100, which consumes power supplied from the energy generator 112 by use of an occupant or user or converted from output of the energy generator 112. In the present disclosure, the load device 116 may be a type of electric device for non-driving purpose excluding a driving power system like the wheel drive unit 114. For example, the load device 114 may be various devices installed in an air-conditioning system, a light system, a seat system and the mobility 100.

In addition, the mobility 100 may include a memory 118 and the processor 120.

The memory 118 may store an application for controlling the mobility 100 and various data and load the application or read and record data at a request of the processor 120. In the present disclosure, the memory 118 may store an application and at least instruction that obtain an immediate feature map and a detailed feature map by inputting image data obtained from the camera 104*b* or the server 200 into a neural network with a two-pathway structure, obtain an aggregate feature map by aggregating the immediate feature map, generate a deep feature map by summating the aggregate feature map and the detailed feature map, generate a task-specific feature map by reflecting task-specific channel attention and task-generic spatial attention in the deep feature map, and provide multiple pieces of output information from the task-specific feature map. In addition, the memory 118 may store an application and at least one instruction that train the neural network with the two-pathway structure by using a loss function suitable for each task.

The memory 118 may have a pretrained AI model capable of generating an immediate feature map and a detailed feature map. The AI model may have been trained based on 3D recognition data, image data, radar data, and location data that are already collected from the mobility 100, the server 200 and another vehicle 300. For example, the AI model may be a deep neural network, for example, such as a convolutional neural network (CNN). The AI model May be updated based on the above-described data that are recognized in real time during driving.

The processor 120 may perform overall control of the vehicle 100. The processor 120 may be configured to execute an application and an instruction stored in the memory 118. The processor 120 may activate autonomous driving in response to an autonomous driving request by a user or a setting of the vehicle 100 itself and control the vehicle 100 to activate autonomous driving at a level applied to the vehicle 100. In addition, the processor 120 may deactivate autonomous driving by a user's release or at a request according to automatic release and control the vehicle 100 to be manually driven.

Regarding the present disclosure, the processor 120 may generate a multi-task AI model with a two-pathway structure by using an application, an instruction and data stored in the memory 118, and extract target data for each task by simultaneously performing, by using the multi-task AI model, multiple tasks such as monocular 3D object detection from input image data, semantic segmentation of an object, and depth estimation.

Specifically, in order to train a multi-task AI model with a two-pathway structure, the processor 120 may obtain an aggregate feature map by aggregating immediate feature maps that are sequentially generated from a plurality of layers arranged on a low-resolution pathway of a neural network with the two-pathway structure with input image data and are also adjacent to each other. In addition, the processor 120 may obtain a detailed feature map from a high-resolution pathway. In the present disclosure, a layer may mean a convolution layer that generates a feature map by using a feature filter or kernel on input data, and 'layer' and 'convolution layer' may be used interchangeably. Hereinafter, for convenience of explanation, 'layer' will be used, and if distinction is necessary, 'convolution layer' may also be used. Then, the processor 120 may generate a deep feature map based on an aggregate feature map and a detailed feature map. As an example, the processor 120 may generate a deep feature map through element-wise summation of an aggregate feature map and a detailed feature map. The processor 120 may generate attention information including task-specific channel attention for each task extracted from intermediate feature maps and task-generic spatial attention extracted from a detailed feature map. Then, the processor 120 generates a task-specific feature map for each task by reflecting the attention information in a deep feature map. The processor 120 may output multiple pieces of task output information by making the task-specific feature map pass through a head network with a multi-head structure and generate a trained multi-task AI model by using a suitable loss function for each task. In addition, the processor 120 may infer a task-specific feature map for each task, which is generated by using the trained multi-task AI model, and provide multiple pieces of task output information. In addition, the processor 120 may receive the trained multi-task AI model from the server 200 and obtain multiple pieces of task output information by using the model.

In the present disclosure, as an example, the processor 120 may be implemented as a single processing module. As another example, processing according to the above description May be performed in a plurality of processing modules, and the processor 120 in the present disclosure may collectively refer to the plurality of processing modules.

The above-described processing of the processor 120 will be described in detail through FIG. 4 to FIG. 9.

Hereinafter, according to another example of the present disclosure, the processing of the processor 120 of the mobility 100 will be described to be performed in the server 200 through FIG. 3.

Figure 3:
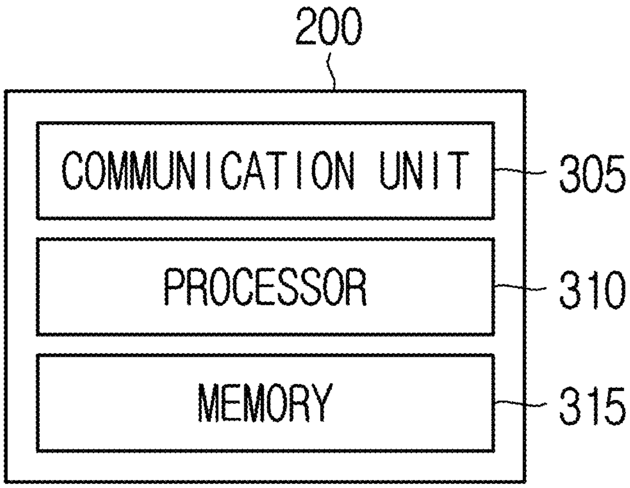
FIG. 3 shows an example of constituent modules of a server.

FIG. 3 shows an example of constituent modules of a server. The server 200 may include a communication unit 305, a processor 310, and a memory 315, and each constituent element is not a necessary constituent element, an additional configuration may be provided or omitted, and one configuration may be included in another configuration or be combined therewith so that a single configuration may perform a plurality of functions.

According to the present disclosure, like the transceiver 106 of the mobility 100, the communication unit 305 may transmit collected image data and AI model data to the mobility 100 or receive image data and AI model data from the mobility 100.

According to the present disclosure, processing of the processor 310 of the server 200 is actually the same as the processing of the processor 120 of the mobility 100 and may generate a trained multi-task AI model by an actually same processing method. Hereinafter, for convenience of description, the processing of the processor of the mobility 100 will be mainly described. Likewise, the memory 315 of the server 200 may store the actually same application and instruction as those of the memory 118.

Hereinafter, a process of generating a trained multi-task AI model and a process of providing multiple pieces of task output information using the AI model will be described with focus on the processing of the processor 120 of the mobility 100.

Figure 4:
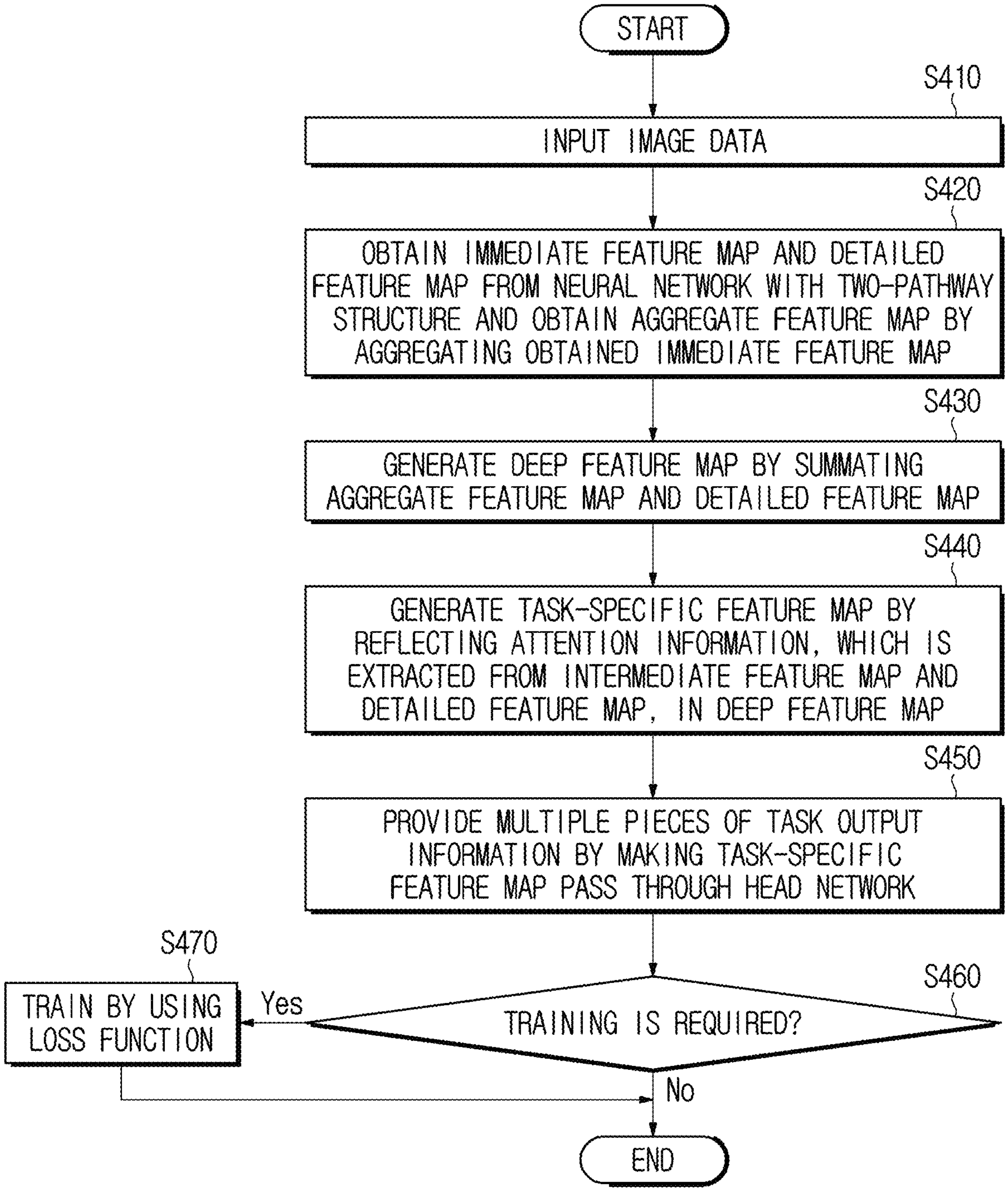
FIG. 4 shows an example method for training a multi-task artificial intelligence (AI) model with a two-pathway structure.

FIG. 4 shows an example method for training a multi-task artificial intelligence (AI) model with a two-pathway structure.

If image data (e.g., input image data) may be obtained from the camera 104*b* (e.g., shown in FIG. 2) and/or the server 200 (e.g., shown in FIG. 3) in S410, the processor 120

(e.g., shown in FIG. 2) may obtain immediate feature maps and/or a detailed feature map from a neural network with a two-pathway structure and/or obtain an aggregate feature map, for example, by aggregating the obtained immediate feature maps in S420.

The pathways may include a low-resolution pathway (e.g., semantic branch) and/or a high-resolution pathway (e.g., detail branch). Each of the pathways (e.g., semantic branch and/or detail branch) may be formed in a neural network structure that may comprise at least one convolution layer, an activation layer, and/or batch normalization.

For example, the image data may be input into the low-resolution pathway, and/or the processor 120 may generate at least one or more immediate feature maps, for example, sequentially from a plurality of layers that may be arranged on the low-resolution pathway through convolution. The high-resolution pathway may be branched from the low-resolution pathway. The detailed feature map may be obtained, for example, from an immediate feature map that may be generated from a layer with a higher resolution than a layer associated with a lowest resolution on the low-resolution pathway. For example, a branching point to the high-resolution pathway may be configured as a convolution layer that may correspond to, for example, ⅛ of a resolution of image data with a high resolution than a layer associated with a lowest resolution (e.g. convolution layer corresponding to, for example, 1/64 of the resolution of the image data (e.g., input image data)). The processor 120 may obtain a detailed feature map through the convolution, for example, without downsampling from the high-resolution pathway, for example, in order to analyze and/or maintain detailed spatial features such as delicate and complex texture and/or patterns.

For example, image data with $w_{image} \times h_{image} \times c_{image}$ size may be input into the low-resolution pathway. A plurality of intermediate feature maps with $$\frac{w}{8}\times\frac{h}{8}\times c',\ \frac{w}{16}\times\frac{h}{16}\times 2c',\ \frac{w}{32}\times\frac{h}{32}\times 4c',\ \frac{w}{64}\times\frac{h}{64}\times 8c'$$

size may be generated through convolution.

Among the intermediate feature maps, an intermediate feature map with $$\frac{w}{8}\times\frac{h}{8}\times c'$$

size, which may correspond to ⅛ of the size of input image data with a higher resolution than a lowest resolution size of $$\frac{w}{64}\times\frac{h}{64}\times 8c'$$

for the immediate feature maps, may be input into the high-resolution pathway. A detailed feature map may be generated, for example, without downsampling from the high-resolution pathway.

The processor 120 may recursively aggregate the one or more intermediate feature maps, for example, to obtain an aggregate feature map.

For example, the processor 120 may recursively aggregate the intermediate feature maps through at least one convolution and/or interpolation. The processor 120 may capture information on the intermediate feature maps that may have various receptive fields that may be generated, for example, during the convolution process. The processor 120 may use skip connection, for example, to aggregate the intermediate feature maps. The processor 120 may aggregate the intermediate feature maps, for example, based on iterative deep aggregation approach, for example, to gradually merge multi-phase features and/or to search for a high-resolution feature. Extracting an object feature of the image data from the low-resolution pathway in this manner may improve 3D object detection performance of the multi-task AI model according to the present disclosure. A process of deriving a single aggregate feature map from a plurality of intermediate feature maps through convolution and/or interpolation may be described in detail in FIG. 5 below.

The processor 120 may generate a deep feature map, for example, by summating the aggregate feature map and the detailed feature map in S430.

For example, the processor 120 may generate the deep feature map, for example, by matching the aggregate feature map and the detailed feature map in dimensions of resolution and channel and by performing element-wise summation. A process of generating a deep feature map may be described in detail in FIG. 7 below.

The processor 120 may generate a task-specific feature map, for example, by reflecting attention information, which may be extracted from the intermediate feature map and/or the detailed feature map, in the deep feature map in S440.

For example, the processor 120 may generate the attention information through a task attention generator. The task attention generator may reflect a weight for a specific position of the deep feature map, for example, to control multiple tasks to be performed without attention paid on unnecessary information and/or inaccurate pattern. The task attention generator may, for example, automatically identify interrelation between multiple tasks, for example, by generating attention information, extract a feature that may be specialized for each task, and/or reduce memory used in performing each task, for example, to prevent computation speed from being lowered and/or to improve execution performance of each task. The task attention generator may generate attention information including task-specific channel attention that may be specialized for each task from the intermediate feature maps and/or task-generic spatial attention that may be commonly applied to each task from the detailed feature map. A process of generating task-specific channel attention and/or task-generic spatial attention may be described in detail in FIG. 8 and FIG. 9 below.

The processor 120 may generate a task-specific feature map for each task, for example, by reflecting the attention information in the deep feature map. For example, the processor 120 may perform element-wise multiplication of the deep feature map and the task-specific channel attention. The processor 120 may summate the multiplication result and the task-generic spatial attention, generating a task-specific feature map.

For example, as described herein, the attention information may be reflected in a deep feature map with $$\frac{w}{8}\times\frac{h}{8}\times c$$

size. Three task-specific feature maps that may be specialized in tasks of object detection, semantic segmentation, and/or depth estimation may be generated.

The processor 120 may provide multiple pieces of task output information, for example, by making the task-specific feature map pass through a head network in S450. The task-specific feature maps may mean a plurality of feature maps that may be specialized in respective tasks, for example, to simultaneously perform multiple tasks such as object detection, semantic segmentation of an object, and/or depth estimation. For example, the multiple pieces of task output information may include multiple pieces of analysis information of the image data with different features. The analysis information may include object classification information, semantic segmentation information of an object, and/or depth information.

The head network may be configured in a multi-head structure that may be capable of outputting multiple pieces of output information based on a task-specific feature map. The multi-head structure may have a head layer that may be allocated to each task. The head layer May include at least one convolution layer and an activation function.

For example, a framework for 3D object detection may comprise a plurality of subtasks. For example, the framework may comprise processes of classification, object center analysis (e.g., center localization), and/or direction analysis (e.g., heading direction estimation). For example, as described herein, the head network may include a Conv-ReLU-Conv (CRC) layer as a head layer that may be allocated to each task, for example, to form a network that may maintain subtasks associated with 3D object detection, semantic segmentation of an object, and/or deep estimation. The head network may have a single structure. For example, the CRC layer may be configured as 3×3Conv-ReLU-1×1Conv.

For example, multiple pieces of task output information on object detection, semantic segmentation, and/or depth estimation may be output after a task-specific feature map with $$\frac{w}{8} \times \frac{h}{8} \times c$$

size passes through the head network.

The processor 120 may train the multi-task AI model by using a loss function, for example, based on an output task, if training is required in S460 and S470. The processor 120 may use a loss function suitable for each task. For example, in the case of a semantic segmentation task, the training may be performed using a loss function based on difference between a predicted probability calculated by the multi-task AI model and an actual probability.

For example, in the case of a semantic segmentation task, the multi-task AI model may be trained using a cross-entropy loss function (e.g., Formula 1) according to the following formula.

$$L = -\frac{1}{N}\sum_{i}^{N}(y_i \log x_i - (1 - y_i)\log(1 - x_i)) \quad \text{[Formula 1]}$$

As described herein, $y_i$ means the predicted probability calculated by the multi-task AI model, and $x_i$ means the actual probability. N may mean a size of a training set.

In the case of a depth estimation task, for example, based on whether or not difference between a predicted value and an actual value is less than a specific threshold, the training may be performed using a loss function that uses an absolute value of the difference or a square of the difference. For example, in the case of depth estimation, the multi-task AI model may be trained using a Smooth L1 loss function (e.g., Formula 2) according to the following formula.

$$l_n = \begin{cases} 0.5(x_n - y_n)^2/\text{beta}, & \text{if } |x_n - y_n| < \text{beta} \\ |x_n - y_n| - 0.5 * \text{beta}, & \text{otherwise} \end{cases} \quad \text{[Formula 2]}$$

As described herein, $x_n$ may mean an actual probability, and $y_n$ may mean a predicted probability. For example, based on whether or not difference between $x_n$ and $y_n$ exceeds a specific threshold (e.g., beta value), a difference function may be used. Sensitivity to an outlier may be reduced and/or convergence speed may be increased.

In the case of an object detection task, the training may be performed by a loss function (e.g., Formula 3) that may use difference between a predicted value and an actual value of depth and predicted uncertainty and/or a loss function (e.g., Formula 4) that may adjust a weight. For example, the multi-task AI model may be trained using either 3DOD depth Loss (e.g., Formula 3) and/or 3DOD heatmap Loss (e.g., Formula 4) as shown herein.

$$\mathcal{L} = \frac{\sqrt{2}}{\sigma}\|d - d*\|_1 + \log\sigma, \quad \text{[Formula 3]}$$

Herein, d* may mean an actual value of depth (e.g., ground truth), and d may mean a predicted value. σ may mean predicted uncertainty, which may indicate an uncertainty degree of a value that the multi-task AI model may predict.

$$L_{det} = \frac{-1}{N}\sum_{c=1}^{C}\sum_{i=1}^{H}\sum_{j=1}^{W} \begin{cases} (1 - p_{cij})^{\alpha}\log(p_{cij}) & \text{if } y_{cij} = 1 \\ (1 - y_{cij})^{\beta}(p_{cij})^{\alpha}\log(1 - p_{cij}) & \text{otherwise} \end{cases} \quad \text{[Formula 4]}$$

Herein, α and β are hyperparameters and may adjust a weight of the loss function. According to an example of the present disclosure, α and β may be set to 2 and 1, respectively. $P_{cij}$ may represent a predicted score at a position (i, j) in heatmap. For example, $P_{cij}$ may mean a predicted value of the AI model for a score that may represent whether or not an object is present at the position.

Additionally or alternatively, a task of object detection may use an L1 loss function (e.g., Formula 5), for example, to learn a size and/or position of an object on a 2D plane and/or a position of an object on a 3D plane. Additionally or alternatively, a task of object detection may use a Size Aware loss function (e.g., Formula 6), for example, to learn a size of an object on a 3D plane. For example, learning of a size and/or a position in a task of object detection may be performed using the loss functions (Formula 5 and Formula 6) herein.

$$L = \sum_{i=1}^{n}|y_i - f(x_i)| \quad \text{[Formula 5]}$$

-continued $$\mathcal{L}_{size} = \left\| \frac{(s - s^*)}{s} \right\|_1, \quad \text{[Formula 6]}$$

For example, by training and/or generating a multi-task AI model with a single double structure that may comprise the above-described attention generator, the processor 120 may simultaneously process multiple tasks such as object detection, semantic segmentation of an object, and/or depth estimation by using less resources than a method of processing the tasks using respective networks. Additionally or alternatively, the processor 120 may mitigate a negative transfer phenomenon in a process of training the multi-task AI model, for example, by reflecting attention information.

Hereinafter, a process of obtaining an aggregate feature map by aggregating immediate feature maps may be described in FIG. 5.

Figure 5:
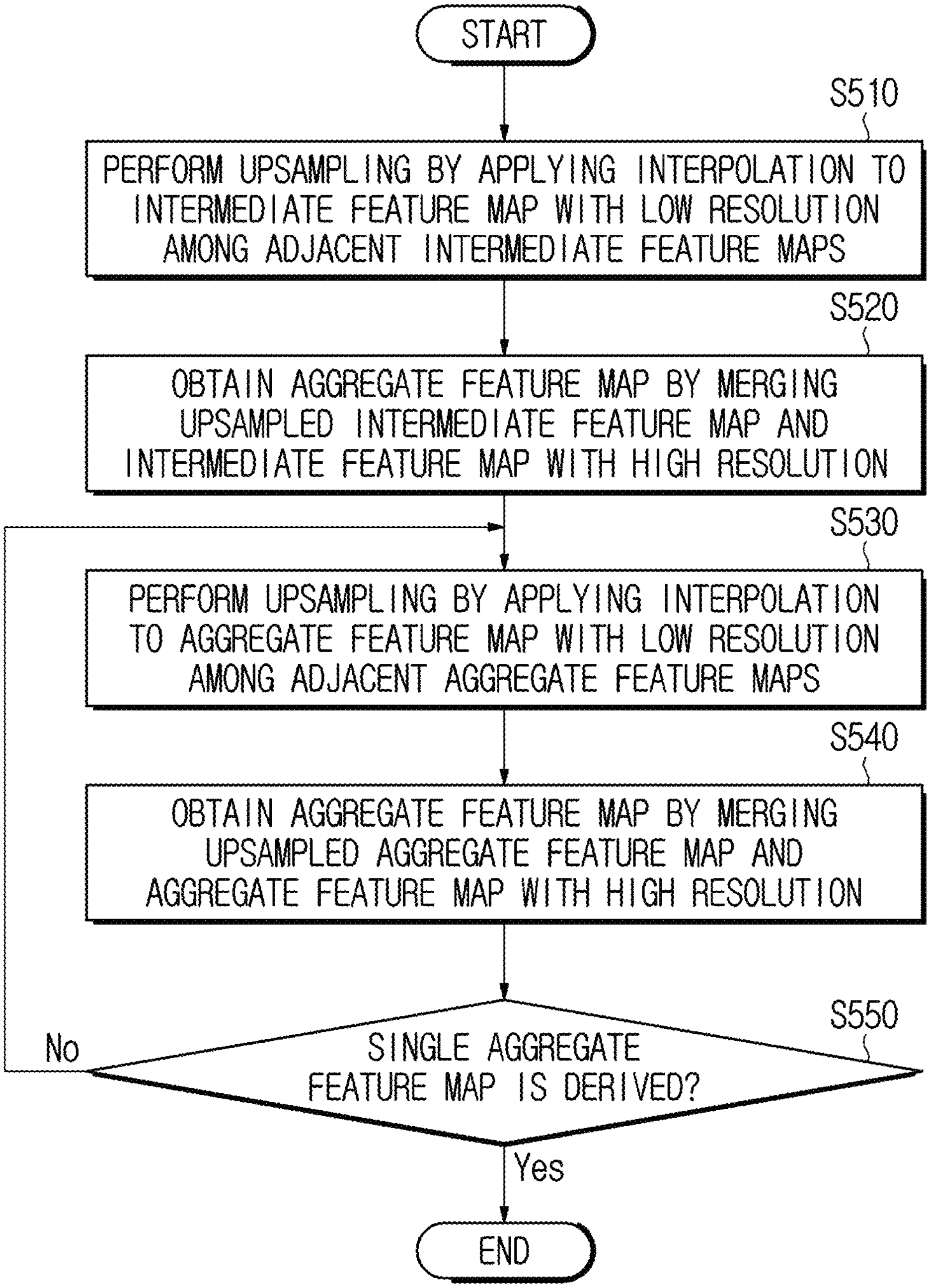
FIG. 5 shows an example method for generating an aggregate feature map.

FIG. 5 shows an example of a flowchart showing a process of generating an aggregate feature map.

The processor 120 (e.g., shown in FIG. 2) may recursively aggregate at least one or more intermediate feature maps, for example, based on convolution and/or interpolation until a single feature map may be produced, for example, to obtain an aggregate feature map. For example, the processor 120 may capture information on the intermediate feature maps having various receptive fields that may be generated, for example, during the convolution process. The processor 120 may use skip connection, for example, to aggregate the intermediate feature maps.

The processor 120 may perform upsampling, for example, by applying interpolation to an intermediate feature map with a low resolution among adjacent intermediate feature maps in S510.

For example, the processor 120 may make an intermediate feature map with a low resolution among at least one or more adjacent intermediate feature maps that may be extracted by a low-resolution pathway pass through a convolution layer. The processor 120 may perform upsampling through the interpolation.

For example, the processor 120 may make an intermediate feature map with a relatively lower resolution (e.g., low resolution) among adjacent intermediate feature maps pass through a first convolution layer including a first weigh. The processor 120 may upsample the intermediate feature map through 2X bilinear interpolation, for example, to have a same resolution as the intermediate feature map with a relatively higher resolution (e.g., high resolution).

The processor 120 may obtain an aggregate feature map, for example, by merging the upsampled intermediate feature map and the intermediate feature map with the high resolution in S520.

For example, the processor 120 may make the upsampled intermediate feature map and/or the intermediate feature map with the high resolution pass through a second convolution layer including a second weight, generating an aggregate feature map with a same resolution as the intermediate feature map with the high resolution.

For example, in case a plurality of aggregate feature maps may be generated through the above-described process, for example, if no single aggregate feature map is obtained, such as the above-described aggregation process, upsampling may be performed by applying interpolation to an aggregate feature map with a low resolution among adjacent aggregate feature maps in S530. The processor 120 may make the aggregate feature map with a low resolution among adjacent aggregate feature maps pass through a convolution layer. The processor 120 may upsample the aggregate feature map through interpolation. For example, the processor 120 may make the upsampled aggregate feature map and/or an aggregate feature map with a high resolution pass through the convolution layer. The processor 120 may obtain an aggregate feature map in S540. The processor 120 may repeat the process from S530 in S550, for example, if no aggregate feature map is derived from the aggregation.

According to an example of the present disclosure, the processor 120 may derive a single aggregate feature map with $$\frac{w}{16} \times \frac{h}{16} \times c$$

size by aggregating intermediate feature maps with resolution sizes of $$\frac{w}{16} \times \frac{h}{16} \times 2c' \text{ and } \frac{w}{32} \times \frac{h}{32} \times 4c', \frac{w}{64} \times \frac{h}{64} \times 8c'.$$

A resolution size of an intermediate feature map and/or a size of a finally derived aggregate feature map relative to input data may not be limited to the above-described example and/or may be different according to a user's setting. Hereinafter, a process of generating an aggregate feature map may be described based on a schematic diagram.

Figure 6:
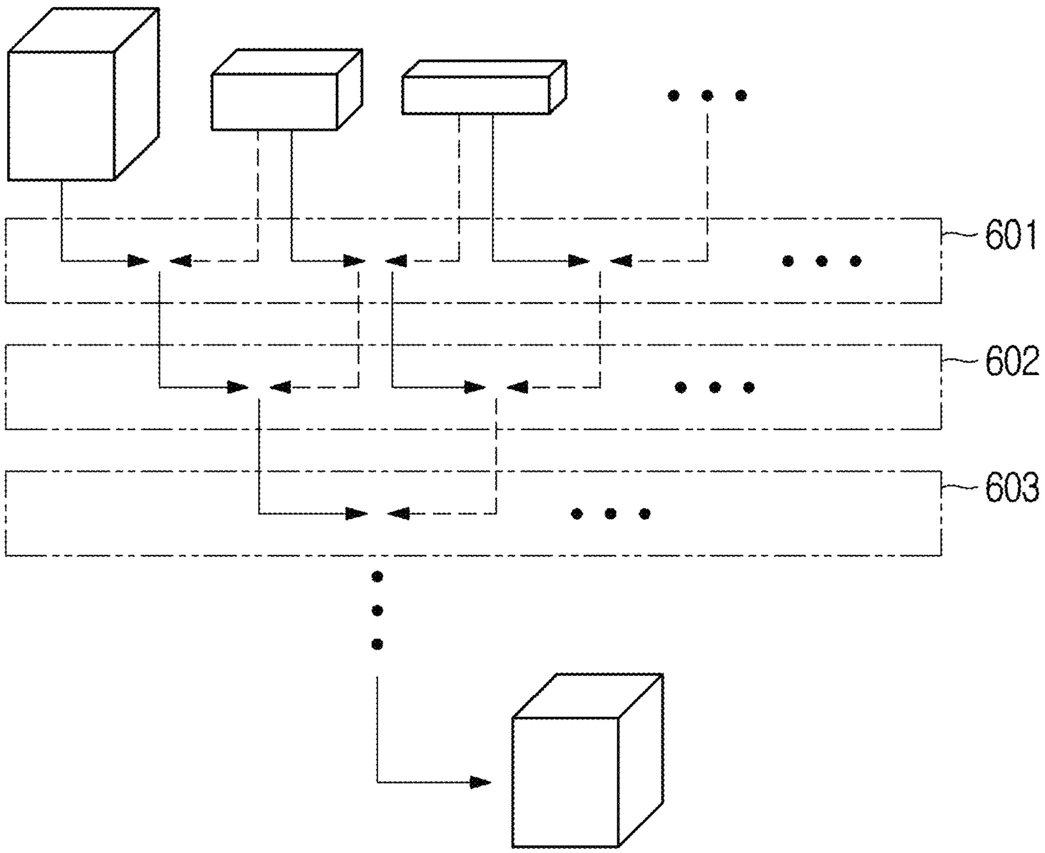
FIG. 6 shows an example of schematic diagram for generating an aggregate feature map.

FIG. 6 is a schematic diagram exemplifying a process of generating an aggregate feature map.

The process of generating an aggregate feature map exemplified in FIG. 6 may be the same as described in FIG. 5. For example, a processor may generate an aggregate feature map by aggregating at least one or more intermediate feature maps that may be extracted from a low-resolution pathway in 601. Among adjacent intermediate feature maps, the processor 120 may recursively aggregate an intermediate feature map with a low resolution, for example, based on an intermediate feature map with a high resolution through upsampling using convolution and/or interpolation. If the aggregation may not result in a single aggregate feature map, the processor 120 may perform recursive aggregation by upsampling an aggregate feature map with a low resolution based on an aggregate feature map with a high resolution among aggregate feature maps generated, for example, after the aggregation through convolution and interpolation in 602 and 603.

Hereinafter, a process of generating a deep feature map based on a generated aggregate feature map and a detailed feature map will be described through FIG. 7.

Figure 7:
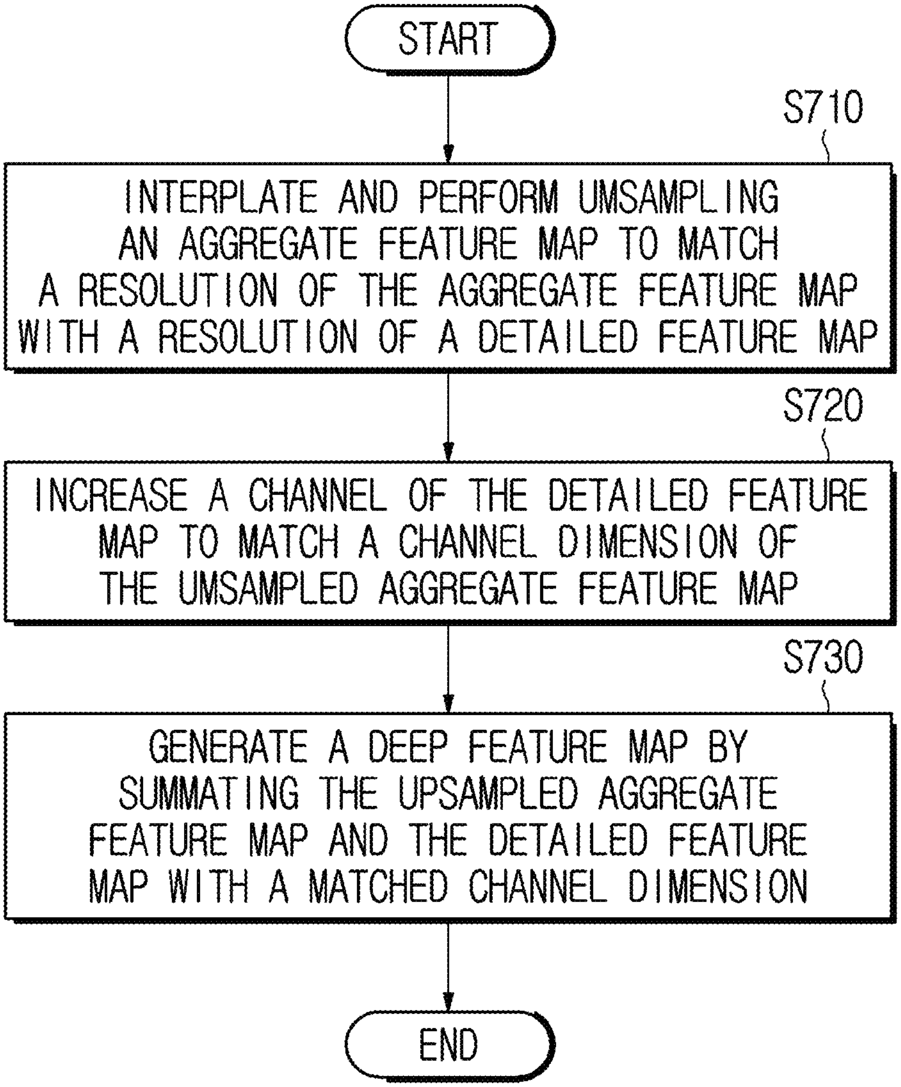
FIG. 7 shows an example method for generating a deep feature map.

FIG. 7 shows an example of a flowchart showing a process of generating a deep feature map.

The processor 120 (e.g., shown in FIG. 2) may interpolate and/or upsample an aggregate feature map, for example, to match a resolution of the aggregate feature map with a resolution of a detailed feature map in S710.

For example, if a detailed feature map may have a size of $$\frac{w}{8} \times \frac{h}{8} \times c',$$

an aggregate feature map with $$\frac{w}{16} \times \frac{h}{16} \times c$$

size may be upsampled through 2× bilinear interpolation, for example, to match the resolution $$\frac{w}{8} \times \frac{h}{8}$$

of the detailed feature map. For example, the processor 120 may upsample a resolution of an aggregate feature map, for example, to become ⅛ of a resolution of image data. A size of a resolution of a detailed feature map may not be limited to the above-described example but may be differently set according to a user's setting. Additionally or alternatively, instead of matching a resolution of a detailed feature map, both the detailed feature map and/or an aggregate feature map may be interpolated, for example, to match a specific resolution.

The processor 120 may increase a channel of the detailed feature map, for example, to match a channel dimension of the upsampled aggregate feature map in S720. The processor 120 may match the channel dimension of the detailed feature map to the channel dimension of the upsampled feature map through a convolution layer.

For example, the processor 120 may make a detailed feature map with $$\frac{w}{8} \times \frac{h}{8} \times c'$$

size correspond to an upsampled aggregate feature map with $$\frac{w}{8} \times \frac{h}{8} \times c$$

size with respect to channel (c) through convolution. The dimension of a channel may not be limited to the above-descried example and may be differently set according to a user's setting. A detailed feature map and/or an upsampled aggregate feature map may be subject to convolution so as to match a specific channel dimension, for example, if the dimension may not correspond to a channel dimension of an aggregate feature map.

The processor 120 may generate a deep feature map by summating the upsampled aggregate feature map and the detailed feature map with a matched channel dimension in S730.

For example, the deep feature map may be generated through element-wise summation of the aggregate feature map and/or the detailed feature map that may match each other with respect to resolution and channel.

Hereinafter, attention information reflected in a generated deep feature map may be described in FIG. 8 and FIG. 9.

Figure 8:
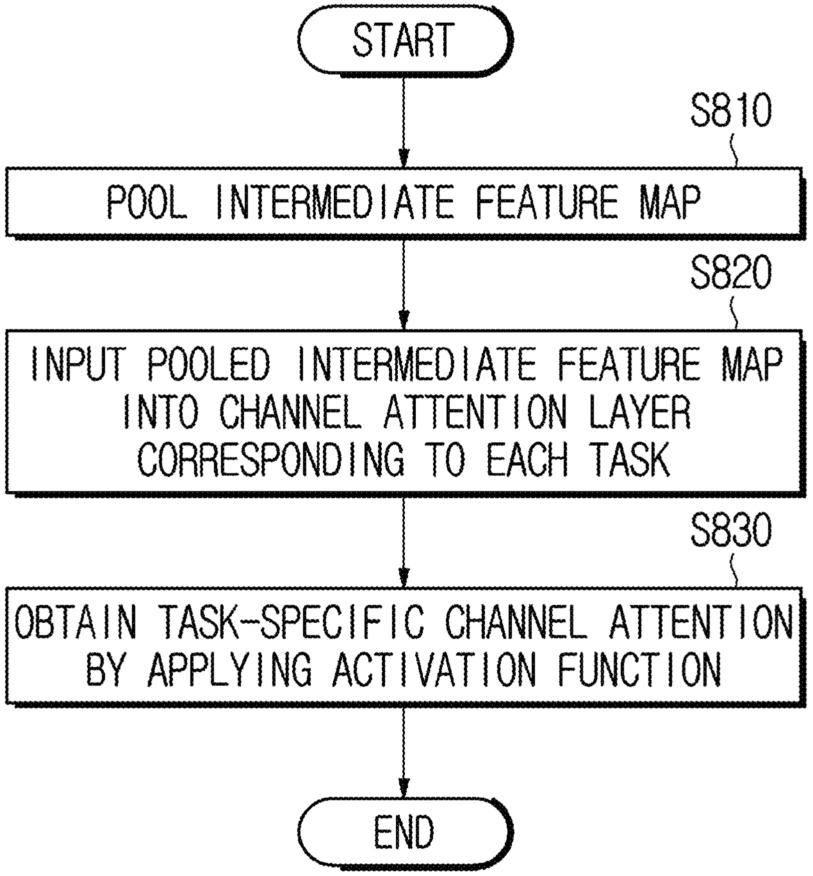
FIG. 8 shows an example method for obtaining task-specific channel attention.

FIG. 8 shows an example of a flowchart showing a process of obtaining task-specific channel attention.

A plurality of task-specific channel attentions may be generated according to each task and/or be obtained by applying an activation function to a value that may be output by inputting an intermediate feature map in a channel attention layer corresponding to each task.

For example, the processor 120 may pool any one of intermediate feature maps that May be generated along a low-resolution pathway in S810. For example, the processor 120 may perform global average pooling on an intermediate feature map. Additionally or alternatively, the processor 120 may perform max pooling on an intermediate feature map. For example, the processor 120 may input an intermediate feature map with a lowest resolution in a low-resolution pathway in order to generate a task-specific channel attention. For example, the processor 120 may perform global average pooling based on a final intermediate feature map including a largest amount of semantic and global information among intermediate feature maps that may be generated along a low-resolution pathway.

The processor 120 may input the pooled intermediate feature map into a channel attention layer corresponding to each task in S820. The channel attention layer may be configured as a multi-layer perceptron that may comprise at least one or more layers. The channel attention layer may involve the above-described pooling process and/or may include a task-specific weight to enable a task to be performed without attention paid on unnecessary information or inaccurate pattern.

The processor 120 may obtain task-specific channel attention by applying an activation function to a result from the channel attention layer in S830. For example, the processor 120 may use a sigmoid function as the activation function, and without being limited thereto, a threshold function (e.g., a ReLU function or any other function), which may be available for training the multi-task AI model according to the present disclosure and for outputting a task, may be used as the activation function.

The processor 120 may obtain task-specific channel attention including a data value for an advantageous channel for performing each task from an aggregate feature map with a hierarchical structure.

For example, the processor 120 may generate task-specific channel attentions of 1×1×256×3 (e.g., 3 tasks) through the above-described process for a final intermediate feature map with a lowest resolution in a low-resolution pathway including a largest amount of semantic and global information and having a size of $$\frac{w}{64} \times \frac{h}{64} \times 8c'.$$

Figure 9:
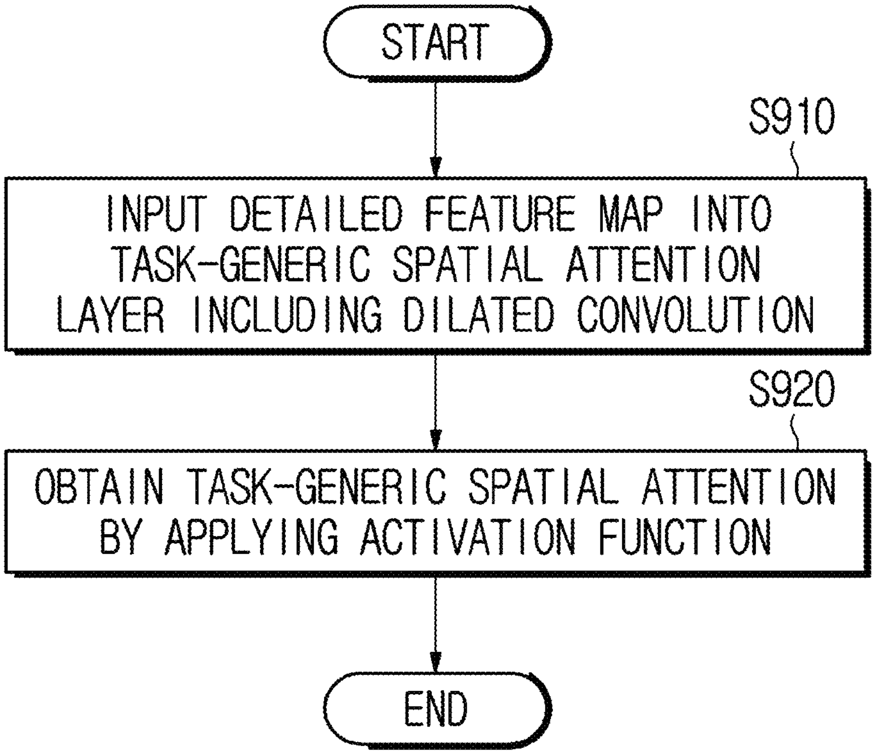
FIG. 9 shows an example method for obtaining task-generic spatial attention.

FIG. 9 shows an example of a flowchart showing a process of obtaining task-generic spatial attention.

The processor 120 may input a detailed feature map into a task-generic spatial attention layer including dilated convolution in S910. For example, the processor 120 may input the detailed feature map into the task-generic spatial attention layer including the dilated convolution. The processor 120 may make a resolution size of the dilated detailed feature map match that of a deep feature map. A channel dimension of the detailed feature map may be reduced in the process of dilated convolution. A reducing rate of channel may be preset. For example, the processor 120 may perform dilated convolution for the detailed feature map with reduced channel dimension of $$\frac{w}{8} \times \frac{h}{8} \times 1$$

size through 3×3 filter and/or perform pooling to match a resolution of $$\frac{w}{8}\times\frac{h}{8}$$

of a deep feature map with $$\frac{w}{8}\times\frac{h}{8}\times c$$

size.

The processor 120 may obtain task-generic spatial attention by applying an activation function in S930. For example, the processor 120 may use a sigmoid function as the activation function. Without being limited thereto, a threshold function (e.g., a ReLU function or any other function), which may be available for training the multi-task AI model according to the present disclosure and/or for outputting a task, may be used as the activation function.

The task-generic spatial attention generated through the above-described process May serve as an edge filter capable of detecting a suddenly changing portion of an image and of identifying a structural feature of an object.

The processor 120 may generate a task-specific feature map by reflecting task-specific channel attention and/or task-generic spatial attention in a deep feature map.

For example, the processor 120 may generate three task-specific feature maps for tasks of semantic segmentation, depth estimation, and/or monocular 3D object detection by multiplying a deep feature map with $$\frac{w}{8}\times\frac{h}{8}\times c$$

size and three task-specific channel attentions with 1×1×256 size in element-wise manner and adding a task-generic spatial attention with $$\frac{w}{8}\times\frac{h}{8}\times 1$$

size to a multiplication result in element-wise manner.

Hereinafter, according to the present disclosure, an example of a multi-task AI model will be described in FIG. 10.

Figure 10:
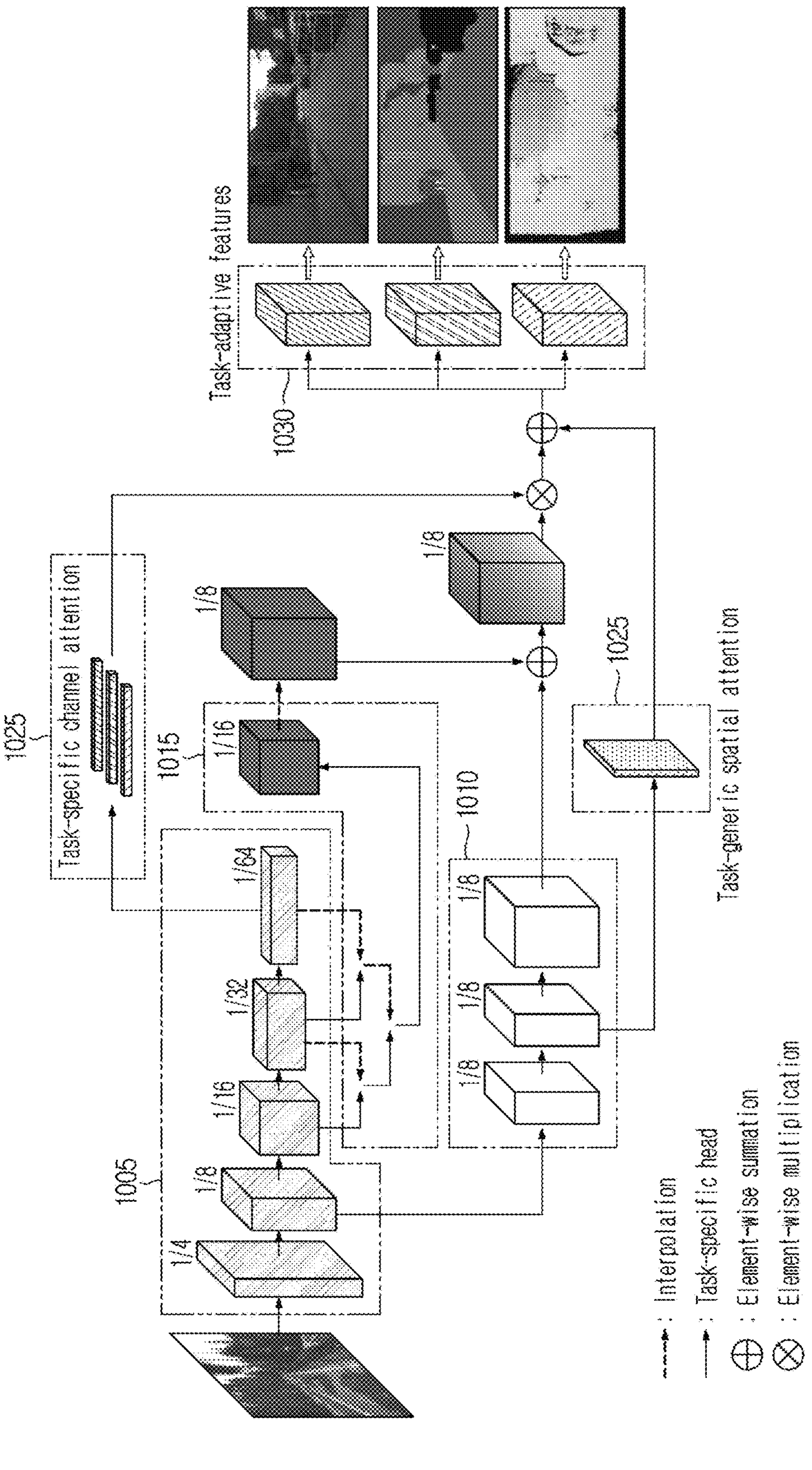
FIG. 10 shows an example of a schematic diagram for a multi-task AI model with a two-pathway structure.

FIG. 10 shows an example of a schematic diagram showing a multi-task AI model with a two-pathway structure according to an example of the present disclosure.

Referring to FIG. 10, a trained multi-task AI model with a two-pathway structure May include a low-resolution pathway 1005 and a high-resolution pathway 1010.

Of two pathways (e.g., the low-resolution pathway 1005 and the high-resolution pathway 1010) of a neural network (e.g., CNN or any other neural networks) where image data may be input, the low-resolution pathway 1005 may produce an intermediate feature map. An adjacent intermediate feature map produced from the low-resolution pathway 1005 may be aggregated as exemplified in the drawing numeral 1015 in order to generate an aggregate feature map. The neural network (e.g., CNN or any other neural networks) may use a pretrained network.

A deep feature map may be generated by summating an aggregate feature map, which May be upsampled through interpolation, and a detailed feature map with a channel matching the aggregate feature map in element-wise manner in S1020.

A task-specific channel attention may be generated based on a final intermediate feature map, which may include a largest amount of semantic and/or global information among intermediate feature maps that may be produced from a low-resolution pathway. A task-generic spatial attention, functioning as an edge filter, may be generated from a detailed feature map.

A task-specific feature map 1030 may be generated through element-wise multiplication of the above-described attention and the deep feature map.

If the task-specific feature map 1030 may pass through a head network, multiple pieces of task output information may be output. The neural network with two pathways may be trained through a loss function, for example, if training mat be required. A multi-task AI model with a two-pathway structure may be generated.

Hereinafter, changes based on whether or not task-specific channel attention and/or task-generic spatial attention may be reflected in a deep feature map may be described through visualization.

Figure 11A:
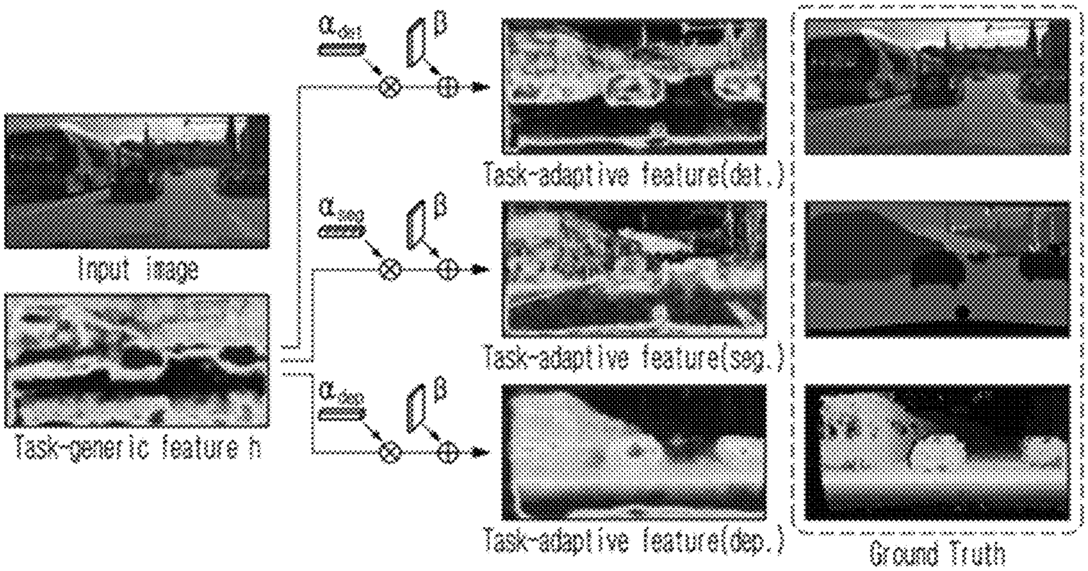
FIG. 11A shows an example of a visualized map of a task-specific feature map reflecting attention.

FIG. 11A show an example of a visualized map of a task-specific feature map reflecting attention.

Figure 11B:
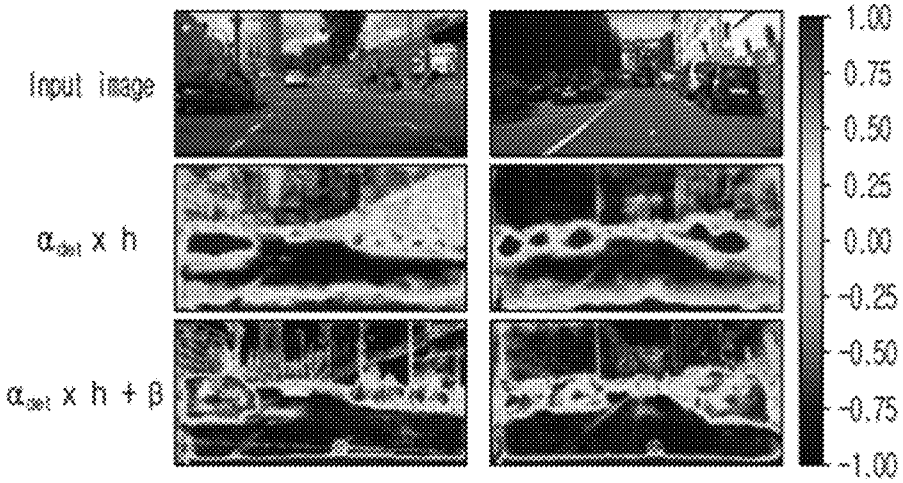
FIG. 11B shows an example of a visualized result difference based on reflection of task-generic spatial attention.

FIG. 11B shows an example of a visualized result difference based on reflection of task-generic spatial attention.

FIG. 11A and FIG. 11B shows example results that use road images as image data.

As described with respect to FIG. 11A, in order to perform tasks such as 3D object detection, semantic segmentation, and/or depth estimation, a deep feature map h, which May include a common feature for each task, may be multiplied by a task-specific channel attention α (e.g., $\alpha_{det}$, $\alpha_{seg}$, $\alpha_{dep}$) in an element-wise manner, and a task-generic spatial attention β may be added to each task in an element-wise manner.

A channel attention for object detection may emphasize a main object that may be emphasized in red in the deep feature map and/or an obstacle that may be associated with 3D sensing task. A channel attention for semantic segmentation may focus on a semantic region and/or may emphasize, for example, "road" class in the road image. Additionally or alternatively, a channel attention for depth estimation may be applied to the deep feature map to closely match a pattern that may be observed in the ground truth.

As described with respect to FIG. 11B, based on whether or not the task-generic spatial attention β may be reflected, a difference of feature maps according to each task may be visually identified. The task-generic spatial attention β, which may be extracted from a detailed feature map of a high-resolution pathway, may emphasize a spatial feature. For example, an object boundary element of the road image such as a car and/or a bicycle rider may be emphasized. Additionally or alternatively, a utility pole and/or a tree may keep their accurate shapes. For example, the task-generic spatial attention β may function as an edge filter.

Hereinafter, a task result based on a multi-task AI model with a two-pathway structure, which may be trained according to the present disclosure, may be described.

FIG. 12 shows an example of comparing results of tasks performed by using a multi-task AI model with a two-pathway structure according to the present disclosure and a conventional AI model for a single task.

As described with respect to FIG. 12, if multiple tasks may be performed using a DLA34 model and/or other models, the resultant performance may diminish compared to the performance of processing a single task using the DLA34 model.

If multiple tasks may be performed using a multi-task AI model with a two-pathway structure, the task results with similar or relatively higher performance may be output compared to processing a single task using the DLA34 model. The performance may be improved, for example, by reflecting attention.

FIG. 13 shows an example of the increase and decrease in performance based on a comparison between a multi-task AI model with a two-pathway structure according to the present disclosure and a conventional AI model for a single task.

As described with respect to FIG. 13, if multiple tasks may be performed using a multi-task AI model with a two-pathway structure according to the present disclosure, performance may be improved both in processing result of each task and in processing speed.

Figure 14:
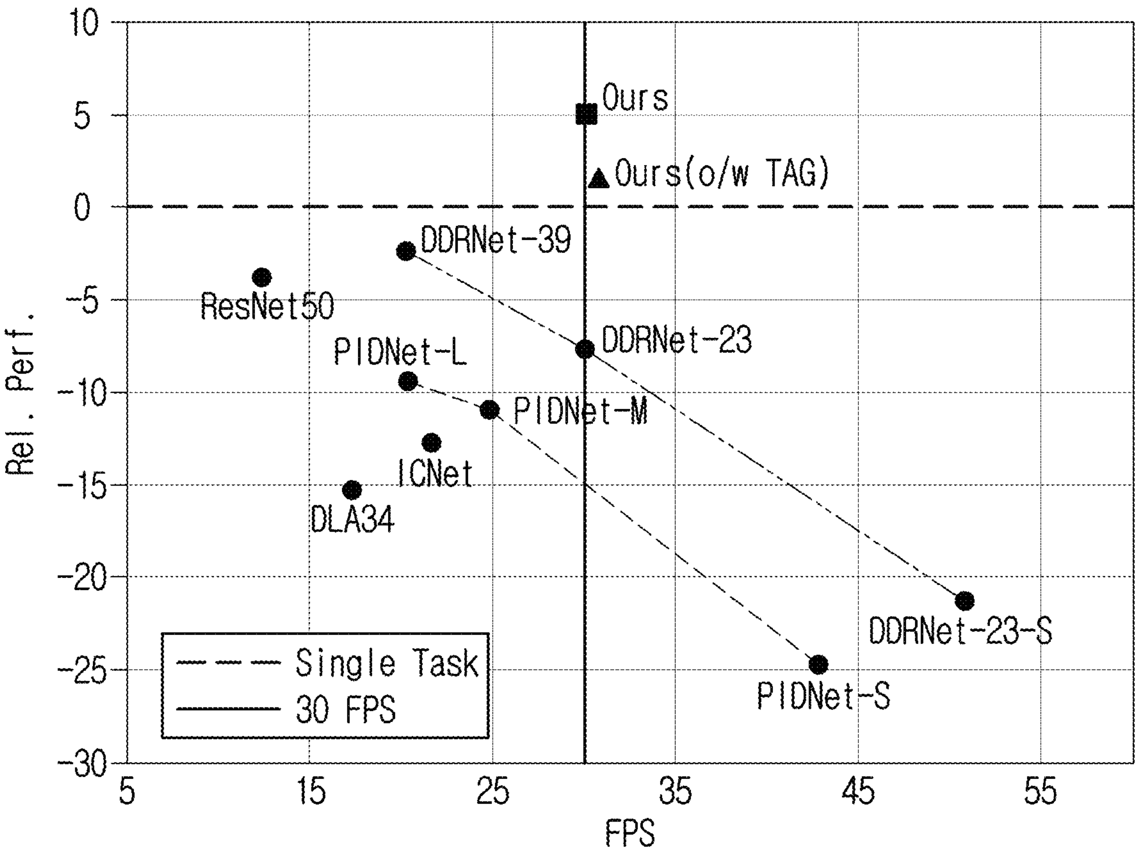
FIG. 14 shows an example of a graph showing a comparison of inference speed per second between a multi-task AI model with a two-pathway structure and an AI model for a single task.

FIG. 14 shows an example of a graph showing a comparison of inference speed per second between a multi-task AI model with a two-pathway structure according to the present disclosure and an AI model for a single task.

As described with respect to FIG. 14, the graph may show a speed-performance trade-off curve for Cityscapes-3D validation set (optimal performance in the upper-right quadrant). The Y-axis may show the average relative performance of multi-task results from each AI model compared to single task results.

According to the present disclosure, a method is provided for multi-task processing based on an artificial intelligence (AI), the method may comprising: obtaining an aggregate feature map by aggregating intermediate feature maps that are generated sequentially and adjacently from a plurality of layers arranged in a low-resolution pathway of a neural network with a two-pathway structure, in which image data is input, and obtaining a detailed feature map from a high-resolution pathway; generating a deep feature map based on the aggregate feature map and the detailed feature map; generating attention information including a task-specific channel attention for each task extracted from the intermediate feature maps and a task-generic spatial attention extracted from the detailed feature map; and generating a task-specific feature map for each task by reflecting the attention information in the deep feature map and providing multiple pieces of task output information by inferring the task-specific feature map.

According to an example of the present disclosure, a mobility device is provided, comprising: a sensor (e.g., camera, blind spot monitoring sensor, line departure warning sensor, parking sensor, light sensor, rain sensor, traction control sensor, anti-lock braking system sensor, tire pressure monitoring sensor, seatbelt sensor, airbag sensor, fuel sensor, emission sensor, throttle position sensor, etc.) unit configured to obtain data associated with an external environment and an internal state of the mobility device and obtain at least image data; a memory configured to store at least one instruction; and a processor configured to execute the at least instruction stored in the memory based on data obtained from the memory, wherein the processor is further may configured to: obtain an aggregate feature map by aggregating intermediate feature maps that are generated sequentially and adjacently from a plurality of layers arranged in a low-resolution pathway of a neural network with a two-pathway structure, in which image data is input, and obtain a detailed feature map from a high-resolution pathway, generate a deep feature map based on the aggregate feature map and the detailed feature map, generate attention information including a task-specific channel attention for each task extracted from the intermediate feature maps and a task-generic spatial attention extracted from the detailed feature map, and generate a task-specific feature map for each task by reflecting the attention information in the deep feature map and provide multiple pieces of task output information by inferring the task-specific feature map.

According to an example of the method of present disclosure, obtaining of the aggregate feature map recursively may aggregates the aggregate feature map from an adjacent layer among the plurality of layers until a single number of the aggregate feature map is produced by an output of the obtaining of the aggregate feature.

According to an example of the method of present disclosure, the obtaining of the aggregate feature map may comprise: upsampling an intermediate feature map with a low resolution among the adjacent intermediate feature maps by applying bilinear interpolation to the intermediate feature map with the low resolution; and merging the upsampled intermediate feature map and an intermediate feature map with a high resolution among the adjacent intermediate feature maps.

According to an example of the method of present disclosure, the obtaining of the detailed feature map may obtain the detailed feature map based on the intermediate feature maps that are generated from a layer with a higher resolution than a layer associated with a lowest resolution in the low-resolution pathway.

According to an example of the method of present disclosure, the generating of the deep feature map may comprises: upsampling the aggregate feature map through the bilinear interpolation; matching a channel dimension of the detailed feature map with a channel dimension of the upsampled aggregate feature map through a convolution layer; and generating the deep feature map through element-wise summation of the upsampled aggregate feature map and the detailed feature map with the matched channel dimension.

According to an example of the method of present disclosure, the task-specific channel attention is may generated in a plural number for the each task, wherein the task-specific channel attention is obtained by applying an activation function to a value that is output by inputting the intermediate feature maps to a channel attention layer corresponding to the each task, and wherein the channel attention layer is configured as a multi-layer neural network involving global average pooling.

According to an example of the method of present disclosure, the intermediate feature maps, which are input to generate the task-specific channel attention, are may an intermediate feature map with a lowest resolution in the low-resolution pathway.

According to an example of the method of present disclosure, the task-generic spatial attention is may obtained by applying an activation function to a value that is output by inputting the detailed feature map to a task-generic spatial attention layer including dilated convolution.

According to an example of the method of present disclosure, the multiple pieces of task output information may include multiple pieces of analysis information about the image data with different features, and wherein the multiple pieces of analysis information include at least two of object classification information, semantic segmentation information, and depth information.

According to an example of the method of present disclosure, the providing of the multiple pieces of task output information may comprises using a head network with a multi-head structure that outputs multiple tasks according to the task-specific feature map, and wherein the multi-head structure has a head layer that is allocated to each of the tasks, and the head layer includes a convolution layer and an activation function.

While the methods of the present disclosure described above are represented as a series of operations for clarity of description, it is not intended to limit the order in which the steps are performed. The steps described above may be performed simultaneously or in different order as necessary. In order to implement the method according to the present disclosure, the described steps may further include different or other steps, may include remaining steps except for some of the steps, or may include other additional steps except for some of the steps.

The various examples of the present disclosure do not disclose a list of all possible combinations and are intended to describe representative aspects of the present disclosure. Aspects or features described in the various examples may be applied independently or in combination of two or more.

In addition, various examples of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various examples to be executed on an apparatus or a computer, a non-transitory computer-readable medium having such software or commands stored thereon and executable on the apparatus or the computer.

What is claimed is:

1. A method performed by an apparatus, of a vehicle, for multi-task processing based on an artificial intelligence (AI), the method comprising:

obtaining an aggregated feature map by aggregating intermediate feature maps that are generated sequentially and adjacently from a plurality of layers arranged in a low-resolution pathway of a neural network having a two-pathway structure, wherein image data is input to the low-resolution pathway;

obtaining a detailed feature map from a high-resolution pathway of the neural network;

generating, based on the aggregated feature map and the detailed feature map, a deep feature map;

generating attention information comprising:

a task-specific channel attention for each task extracted from the intermediate feature maps; and a task-generic spatial attention extracted from the detailed feature map;

generating a task-specific feature map for each task by reflecting the attention information in the deep feature map, and providing multiple pieces of task output information based on the generated task-specific feature map; and causing, based on at least the task-specific feature map, autonomous driving control of the vehicle.

2. The method of claim 1, wherein the obtaining of the aggregated feature map comprises:

recursively aggregating the aggregated feature map from an adjacent layer among the plurality of layers until a single number of the aggregated feature map is produced by an output of the obtaining of the aggregated feature map.

3. The method of claim 1, wherein the obtaining of the aggregated feature map comprises:

upsampling an intermediate feature map having a first resolution, lower than a threshold resolution, among adjacent intermediate feature maps by applying a bilinear interpolation to the intermediate feature map having the first resolution; and merging the upsampled intermediate feature map and an intermediate feature map having a second resolution, higher than the threshold resolution, among the adjacent intermediate feature maps.

4. The method of claim 1, wherein the obtaining of the detailed feature map comprises:

obtaining the detailed feature map based on intermediate feature maps that are generated from a layer with a higher resolution than a layer associated with a lowest resolution in the low-resolution pathway.

5. The method of claim 1, wherein the generating of the deep feature map comprises:

upsampling, using a bilinear interpolation, the aggregated feature map;

matching, through a convolution layer, a channel dimension of the detailed feature map with a channel dimension of the upsampled aggregated feature map; and generating the deep feature map using an element-wise summation of the upsampled aggregated feature map and the detailed feature map with the matched channel dimension.

6. The method of claim 1, wherein the task-specific channel attention is generated in a plural number for the each task, wherein the task-specific channel attention is obtained by applying an activation function to a value that is output by inputting the intermediate feature maps to a channel attention layer corresponding to the each task, and wherein the channel attention layer is configured as a multi-layer neural network involving global average pooling.

7. The method of claim 6, wherein intermediate feature maps, which are input to generate the task-specific channel attention, are intermediate feature maps with a lowest resolution in the low-resolution pathway.

8. The method of claim 1, further comprising obtaining the task-generic spatial attention by applying an activation function to a value that is output by inputting the detailed feature map to a task-generic spatial attention layer including dilated convolution.

9. The method of claim 1, wherein the multiple pieces of task output information comprise multiple pieces of analysis information about the image data with different features, and wherein the multiple pieces of analysis information comprise at least two of object classification information, semantic segmentation information, and depth information.

10. The method of claim 1, wherein the providing of the multiple pieces of task output information comprises:

using a head network having a multi-head structure that outputs multiple tasks according to the task-specific feature map, and wherein the multi-head structure has a head layer that is allocated to each of the tasks, and the head layer comprises a convolution layer and an activation function.

11. A vehicle comprising:
a sensor configured to obtain data associated with an external environment of the vehicle and an internal state of the vehicle and to obtain at least image data;
a memory configured to store at least one instruction; and
a processor configured to execute the at least one instruction to cause the vehicle to:
obtain an aggregated feature map by aggregating intermediate feature maps that are generated sequentially and adjacently from a plurality of layers arranged in a low-resolution pathway of a neural network having a two-pathway structure, wherein image data is input to the low-resolution pathway,
obtain a detailed feature map from a high-resolution pathway of the neural network,
generate, based on the aggregated feature map and the detailed feature map, a deep feature map,
generate attention information comprising:
a task-specific channel attention for each task extracted from the intermediate feature maps; and
a task-generic spatial attention extracted from the detailed feature map,
generate a task-specific feature map for each task by reflecting the attention information in the deep feature map, and provide multiple pieces of task output information based on the generated task-specific feature map, and
cause, based on at least the task-specific feature map, autonomous driving control of the vehicle.

12. The vehicle of claim 11, wherein the processor is further configured to execute the at least one instruction to cause the vehicle to obtain the aggregated feature map by recursively aggregating the aggregated feature map from an adjacent layer among the plurality of layers until a single number of the aggregated feature map is produced by an output of the obtaining of the aggregated feature map.

13. The vehicle of claim 11, wherein the processor is further configured to execute the at least one instruction to cause the vehicle to obtain the aggregated feature map by:
upsampling an intermediate feature map having a first resolution, lower than a threshold resolution, among adjacent intermediate feature maps by applying a bilinear interpolation to the intermediate feature map having the first resolution; and
merging the upsampled intermediate feature map and an intermediate feature map having a second resolution, higher than the threshold resolution, among the adjacent intermediate feature maps.

14. The vehicle of claim 11, wherein the processor is further configured to execute the at least one instruction to cause the vehicle to obtain the detailed feature map by obtaining the detailed feature map based on intermediate feature maps that are generated from a layer with a higher resolution than a layer associated with a lowest resolution in the low-resolution pathway.

15. The vehicle of claim 11, wherein the processor is further configured to execute the at least one instruction to cause the vehicle to:
upsample, using a bilinear interpolation, the aggregated feature map,
match, through a convolution layer, a channel dimension of the detailed feature map with a channel dimension of the upsampled aggregated feature map, and
generate the deep feature map using an element-wise summation of the upsampled aggregated feature map and the detailed feature map with the matched channel dimension.

16. The vehicle of claim 11, wherein the task-specific channel attention is generated in a plural number for the each task,
wherein the task-specific channel attention is obtained by applying an activation function to a value that is output by inputting the intermediate feature maps to a channel attention layer corresponding to the each task, and
wherein the channel attention layer is configured as a multi-layer neural network involving global average pooling.

17. The vehicle of claim 16, wherein intermediate feature maps, which are input to generate the task-specific channel attention, are intermediate feature maps with a lowest resolution in the low-resolution pathway.

18. The vehicle of claim 11, wherein the processor is further configured to execute the at least one instruction to cause the vehicle to obtain the task-generic spatial attention by applying an activation function to a value that is output by inputting the detailed feature map to a task-generic spatial attention layer including dilated convolution.

19. The vehicle of claim 11, wherein the multiple pieces of task output information comprise multiple pieces of analysis information about the image data with different features, and
wherein the multiple pieces of analysis information comprise at least two of object classification information, semantic segmentation information, and depth information.

20. The vehicle of claim 11, wherein the processor is further configured to execute the at least one instruction to cause the vehicle to use a head network having a multi-head structure that outputs multiple tasks according to the task-specific feature map, and
wherein the multi-head structure has a head layer that is allocated to each of the tasks, and the head layer comprises a convolution layer and an activation function.

* * * * *